(12) United States Patent
Sanekata

(10) Patent No.: US 11,761,525 B2
(45) Date of Patent: Sep. 19, 2023

(54) STRAIN WAVE GEAR UNIT, GEAR TRANSMISSION DEVICE, AND VALVE TIMING CHANGING DEVICE

(71) Applicant: MIKUNI CORPORATION, Tokyo (JP)

(72) Inventor: Yuuhei Sanekata, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 254 days.

(21) Appl. No.: 17/428,269

(22) PCT Filed: Sep. 10, 2019

(86) PCT No.: PCT/JP2019/035432
§ 371 (c)(1),
(2) Date: Aug. 3, 2021

(87) PCT Pub. No.: WO2020/217562
PCT Pub. Date: Oct. 29, 2020

(65) Prior Publication Data
US 2022/0107013 A1    Apr. 7, 2022

(30) Foreign Application Priority Data

Apr. 26, 2019  (JP) .................................. 2019-085161

(51) Int. Cl.
*F16H 49/00*  (2006.01)
*F01L 1/344*  (2006.01)
(Continued)

(52) U.S. Cl.
CPC ............ *F16H 49/001* (2013.01); *F01L 1/022* (2013.01); *F01L 1/344* (2013.01); *F01L 1/352* (2013.01);
(Continued)

(58) Field of Classification Search
CPC ............ F16H 49/001; F16H 2049/003; F16H 57/0421; F16H 57/0424; F16H 57/0427;
(Continued)

(56) References Cited

U.S. PATENT DOCUMENTS

2019/0120092 A1* 4/2019 Nemoto .................. F01L 1/022

FOREIGN PATENT DOCUMENTS

CN      107387725      11/2017
DE      102015017188   4/2017
(Continued)

OTHER PUBLICATIONS

"International Search Report (Form PCT/ISA/210) of PCT/JP2019/035432," dated Oct. 21, 2019, with English translation thereof, pp. 1-4.

*Primary Examiner* — Loren C Edwards
(74) *Attorney, Agent, or Firm* — JCIPRNET

(57) ABSTRACT

This strain wave gear unit includes: a bottomed cylindrical first internal gear having internal teeth formed on a cylindrical part and a teeth-non-formed part protruding farther inward than the tooth bottom of the internal teeth in a corner area where a bottom wall part is integrally connected to the cylindrical part; a flexible cylindrical external gear having external teeth meshing with the internal teeth of the first internal gear, an opposed part opposed to the teeth-non-formed part with a gap therebetween, and an end part opposed to the bottom wall part to make contact therewith; a second internal gear arranged adjacent to the first internal gear and having internal teeth meshing with the external teeth; and a rotation member that causes the external gear to deform in an oval shape and causes the meshing position to move while partially meshing with the first internal gear and the second internal gear.

14 Claims, 16 Drawing Sheets

(51) Int. Cl.
    *F01L 1/356*      (2006.01)
    *F16H 57/04*      (2010.01)
    *F01L 1/352*      (2006.01)
    *F01L 1/02*       (2006.01)

(52) U.S. Cl.
    CPC .......... *F01L 1/356* (2013.01); *F16H 57/0424* (2013.01); *F16H 57/0428* (2013.01); *F01L 2810/02* (2013.01); *F16H 57/043* (2013.01); *F16H 2049/003* (2013.01)

(58) Field of Classification Search
    CPC .... F16H 57/0428; F16H 57/043; F01L 1/022; F01L 1/344; F01L 1/352; F01L 1/356; F01L 2810/02
    See application file for complete search history.

(56) References Cited

FOREIGN PATENT DOCUMENTS

| | | |
|---|---|---|
| JP | 2015102110 | 6/2015 |
| JP | 2016125343 | 7/2016 |
| JP | 2017223246 | 12/2017 |
| JP | 2018155313 | 10/2018 |
| WO | 2017098663 | 6/2017 |

\* cited by examiner

STRAIN WAVE GEAR UNIT, GEAR TRANSMISSION DEVICE, AND VALVE TIMING CHANGING DEVICE

CROSS-REFERENCE TO RELATED APPLICATION

This application is a 371 application of the International PCT application serial no. PCT/JP2019/035432, filed on Sep. 10, 2019, which claims the priority benefits of Japan Patent Application No. 2019-085161, filed on Apr. 26, 2019. The entirety of each of the above-mentioned patent applications is hereby incorporated by reference herein and made a part of this specification.

BACKGROUND

Technical Field

The invention relates to a ring type (also referred to as a flat type) strain wave gear unit including an internal gear and a cylindrical external gear, and in particular relates to a strain wave gear unit including a bottomed cylindrical internal gear, a gear transmission device, and a valve timing changing device for an engine.

Description of Related Art

As a conventional strain wave gear unit, a strain wave gearing device is known, which includes two internal gears formed in a cylindrical shape, two plate-shaped members respectively fixing the two internal gears, a flexible external gear formed in a cylindrical shape to mesh with the two internal gears, and a wave generator causing the external gear to deform in an oval shape (see Patent Document 1, for example).

In this device, the cylindrical internal gear is fixed to the plate-shaped member that serves as a bottom wall to form a bottomed cylindrical (cup-shaped) internal gear having a cylindrical part and a bottom wall part. In this configuration, it is possible to form internal teeth over the entire inner peripheral surface of the internal gear in the width direction, but since the bottomed cylindrical internal gear is composed of a plurality of parts such as the cylindrical internal gear, the plate-shaped member, and screws for fastening, there is a large number of parts and assembly work is also required.

Therefore, when trying to integrally form the bottomed cylindrical internal gear defined by the cylindrical part and the bottom wall part by processing, the internal teeth cannot be formed over the entire width of the cylindrical part, and in a corner area where the cylindrical part is continuous with the bottom wall part, there is a teeth-non-formed area where teeth are not formed or complete teeth are not formed.

To deal with this, it is possible to remove the teeth-non-formed area by cutting it into a concave shape through cutting processing, but it results in an increase in processing man-hours and an increase in manufacturing cost. Further, it is possible to use a pressing member or the like as disclosed in Patent Document 2, for example, to regulate the movement in the thrust direction so that the external teeth of the external gear do not interfere with the teeth-non-formed area, but it increases the size of the device in the width direction of the external gear, complicates the structure, increases the number of parts, and raises the cost.

RELATED ART

Patent Document

[Patent Document 1] Japanese Laid-Open No. 2017-223246
[Patent Document 2] International Publication No. WO2017/098663

SUMMARY

Problems to be Solved

In view of the above, the invention provides a strain wave gear unit, a gear transmission device, and a valve timing changing device that simplify the structure, reduce the size, reduce the number of parts, and lower the cost.

Means for Solving the Problems

A strain wave gear unit according to the invention includes a first internal gear having a bottomed cylindrical shape and including internal teeth that are formed on a cylindrical part, and a teeth-non-formed part that protrudes farther inward than a tooth bottom of the internal teeth in a corner area where a bottom wall part is integrally continuous with the cylindrical part; an external gear being flexible, having a cylindrical shape, and including external teeth that mesh with the internal teeth of the first internal gear, an opposed part that is opposed to the teeth-non-formed part with a gap, and an end part that is opposed to the bottom wall part so as to contact the bottom wall part; a second internal gear arranged adjacent to the first internal gear and including internal teeth that mesh with the external teeth; and a rotation member causing the external gear to deform in an oval shape and causing a meshing position to move while partially meshing with the first internal gear and the second internal gear.

The above strain wave gear unit may adopt a configuration that the external gear includes the opposed part on each of both sides in a width direction.

The above strain wave gear unit may adopt a configuration that the second internal gear has a cylindrical shape, the second internal gear is provided with a cover member that is adjacent to a side opposite to the first internal gear and covers the external gear, and a width dimension of the external gear is set to be smaller than a separation dimension between the bottom wall part of the first internal gear and the cover member.

The above strain wave gear unit may adopt a configuration that the first internal gear includes an oil passage that has a groove shape and extends in a radial direction on the bottom wall part to which the end part of the external gear is opposed.

The above strain wave gear unit may adopt a configuration that the second internal gear is formed in a bottomed cylindrical shape and includes the internal teeth formed on a cylindrical part, and a teeth-non-formed part that protrudes farther inward than a tooth bottom of the internal teeth in a corner area where a bottom wall part is integrally continuous with the cylindrical part.

The above strain wave gear unit may adopt a configuration that a width dimension of the external gear is set to be smaller than a separation dimension between the bottom wall part of the first internal gear and the bottom wall part of the second internal gear.

The above strain wave gear unit may adopt a configuration that the opposed part is formed by thinning an outer peripheral area of the external gear.

The above strain wave gear unit may adopt a configuration that the opposed part is a conical inclined surface.

The above strain wave gear unit may adopt a configuration that the opposed part is a cylindrical surface having a smaller outer diameter than the external teeth.

The above strain wave gear unit may adopt a configuration that the opposed part is formed of a conical inclined surface and a cylindrical surface that is continuous with the inclined surface and has a smaller outer diameter than the external teeth.

A gear transmission device according to the invention includes an input shaft, an output shaft, a housing rotatably supporting the output shaft, and a transmission unit interposed between the input shaft and the output shaft. The transmission unit includes any of the strain wave gear unit having the above configuration.

The above gear transmission device may adopt a configuration that the rotation member of the strain wave gear unit rotates integrally with the input shaft, the first internal gear of the strain wave gear unit rotates integrally with the output shaft, and the second internal gear of the strain wave gear unit is fixed to the housing.

A valve timing changing device according to the invention is a valve timing changing device for an engine, including a phase changing unit that changes a relative rotation phase of a camshaft and a housing rotor interlocked with a crankshaft, and changing an opening/closing timing of an intake or exhaust valve driven by the camshaft to an advance angle side or a retard angle side. The phase changing unit includes any of the strain wave gear unit having the above configuration, the first internal gear of the strain wave gear unit is connected so as to rotate integrally with the camshaft, and the second internal gear of the strain wave gear unit is connected so as to rotate integrally with the housing rotor.

The above valve timing changing device may adopt a configuration that the rotation member of the strain wave gear unit is formed so as to transmit a rotational force of an electric motor.

Effects

The strain wave gear unit, the gear transmission device, and the valve timing changing device having the above configuration can simplify the structure, reduce the size, reduce the number of parts, and lower the cost.

DESCRIPTION OF THE EMBODIMENTS

Figure 1:
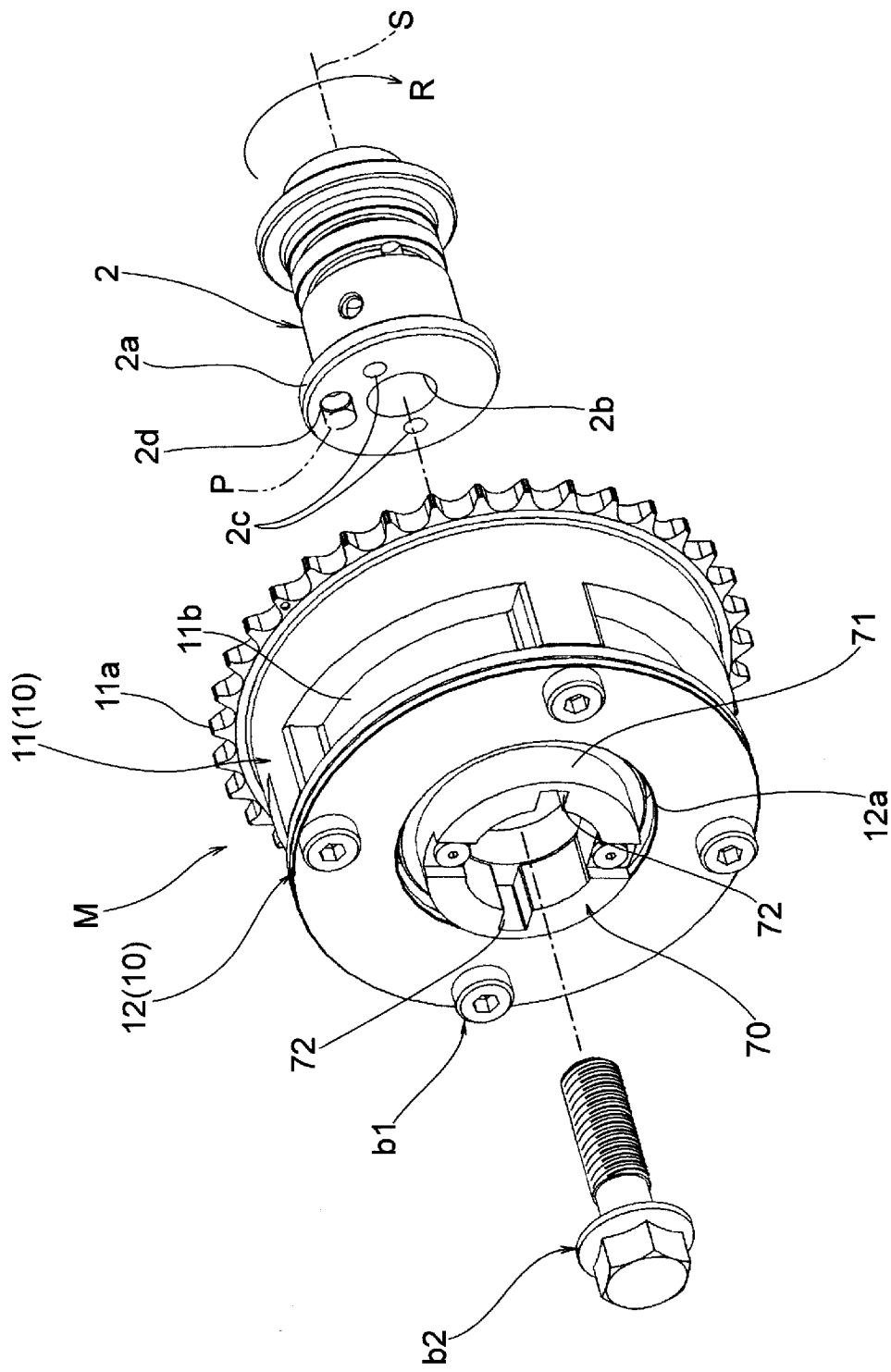
FIG. 1 is an external perspective view of the valve timing changing device using the strain wave gear unit according to an embodiment of the invention as viewed obliquely from the front.
Figure 2:
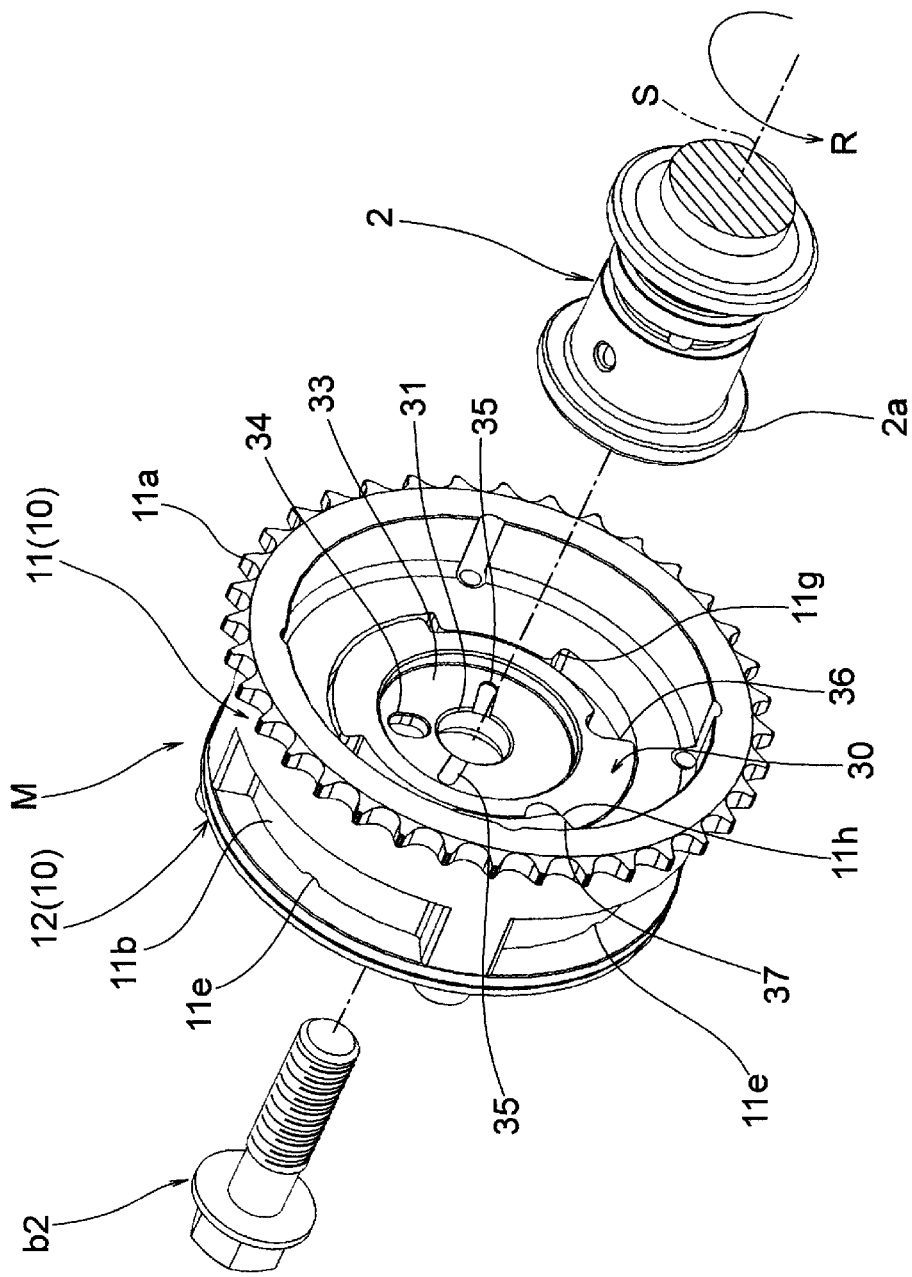
FIG. 2 is an external perspective view of the valve timing changing device using the strain wave gear unit according to an embodiment of the invention as viewed obliquely from the rear.

Hereinafter, embodiments of the invention will be described with reference to the accompanying drawings. As shown in FIG. 1 and FIG. 2, a valve timing changing device M according to an embodiment includes a phase changing unit that changes the relative rotation phase of a camshaft 2 and a sprocket 11a. Here, the camshaft 2 rotates in one direction (the R direction in FIG. 1) around an axis S and includes a collar-shaped fitting part 2a, a screw hole 2b, an oil passage 2c, and a fitting hole 2d for a positioning pin P. The sprocket 11a rotates in one direction (the R direction) around the axis S and is interlocked with the rotation of a crankshaft via a chain.

Then, the phase changing unit is appropriately driven and controlled by an electric motor so as to change an opening/closing timing (valve timing) of an intake valve or an exhaust valve driven by the camshaft 2.

Figure 3:
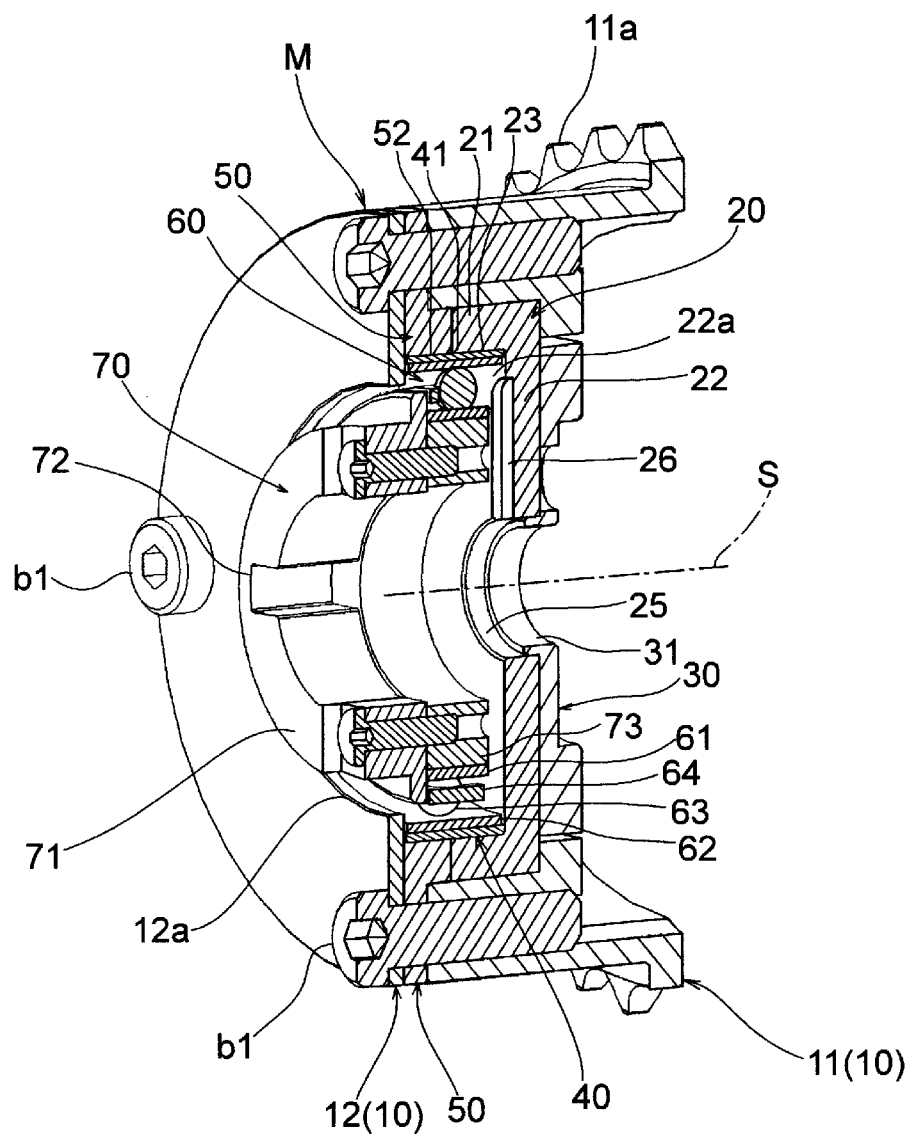
FIG. 3 is a perspective cross-sectional view of the valve timing changing device shown in FIG. 1.
Figure 4:
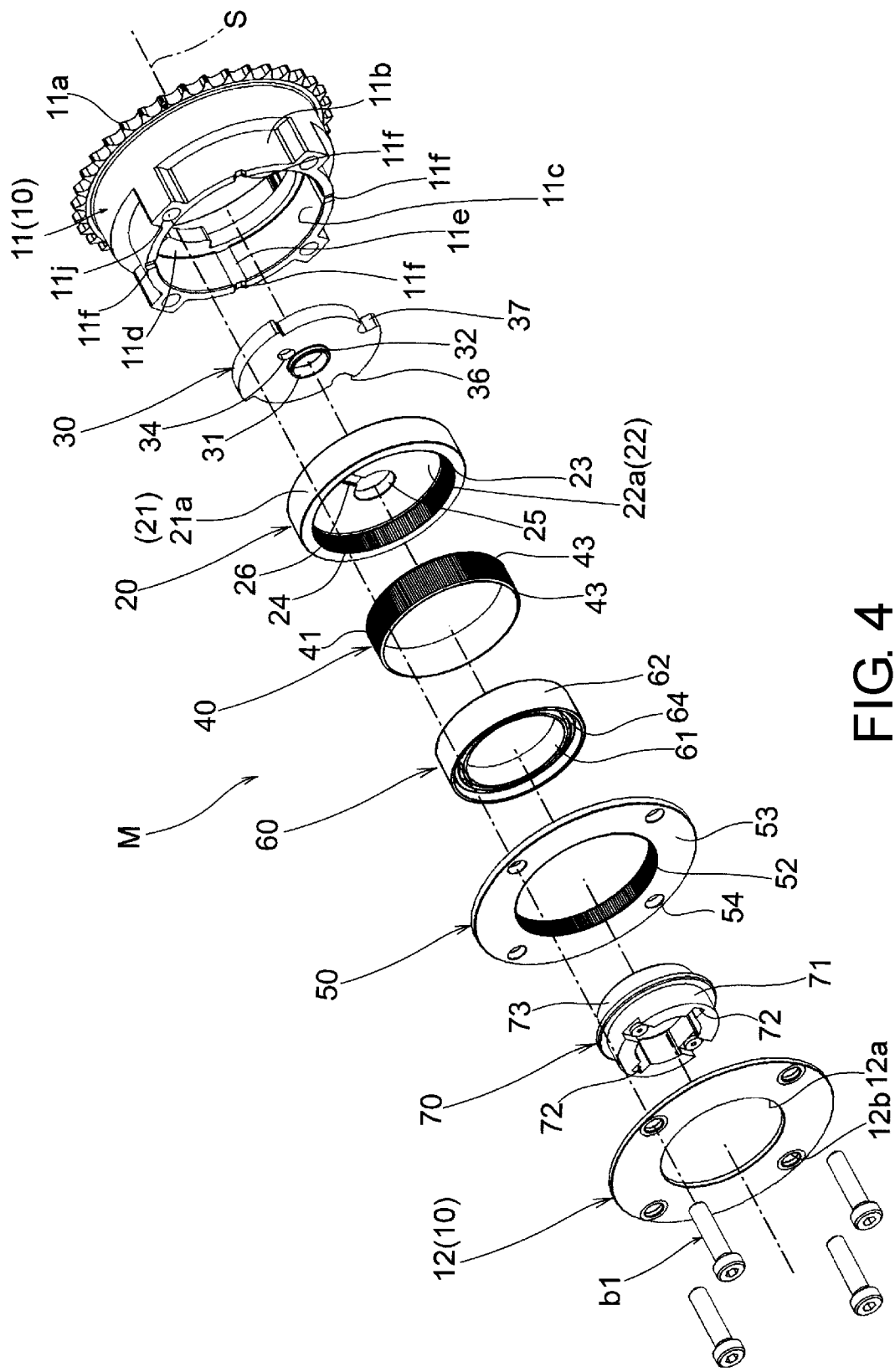
FIG. 4 is an exploded perspective view of the valve timing changing device shown in FIG. 1.
Figure 5:
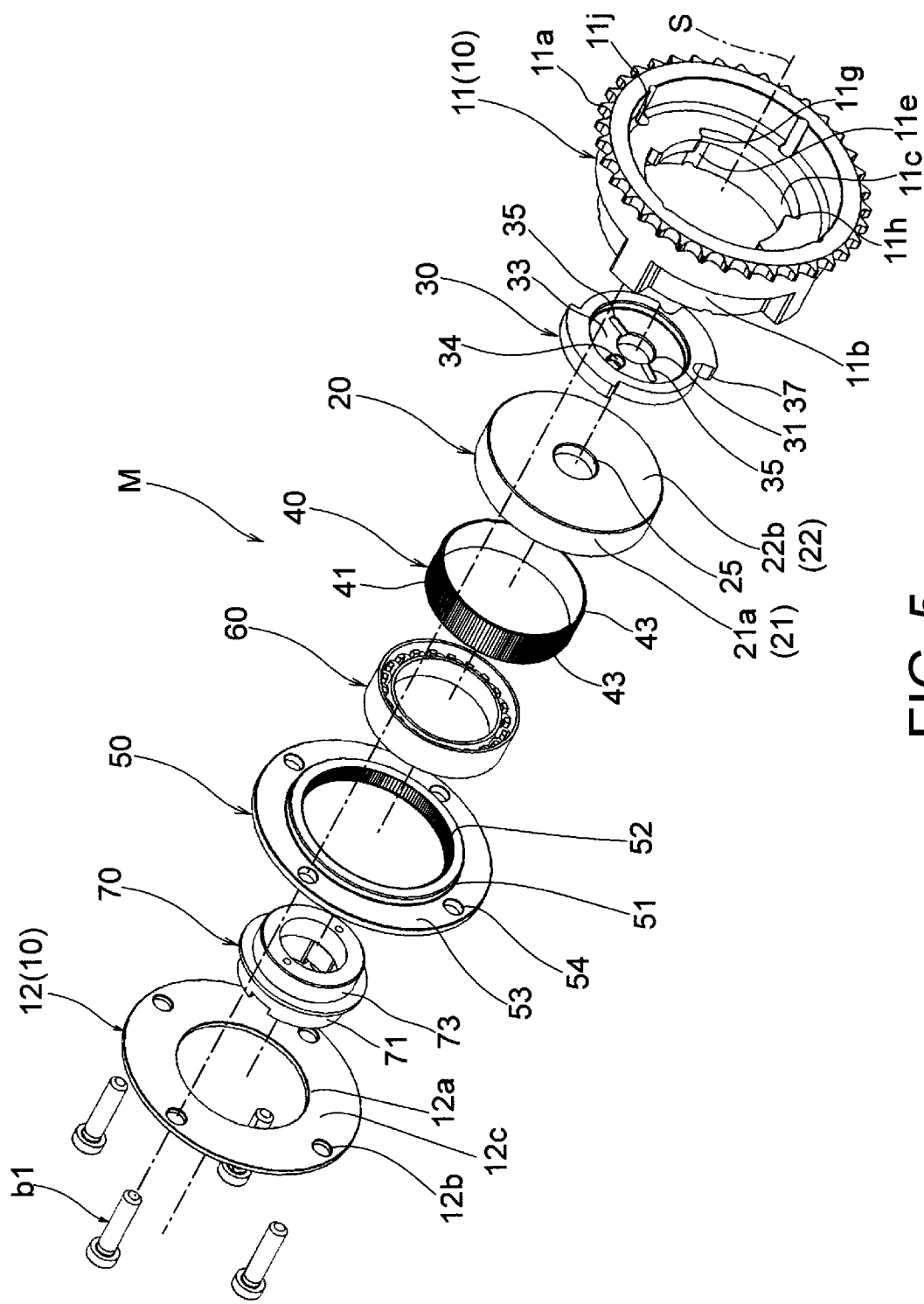
FIG. 5 is an exploded perspective view of the valve timing changing device shown in FIG. 2.

As shown in FIG. 3 to FIG. 5, the phase changing unit includes a housing rotor 10, a first internal gear 20, a rotor 30, an external gear 40, a second internal gear 50, a bearing 60, and a rotation member 70. Here, a strain wave gear unit is composed of the first internal gear 20, the external gear 40, the second internal gear 50, and the rotation member 70.

The housing rotor 10 includes a first housing 11 that is rotatably supported around the axis S, and a second housing 12 that is joined to the first housing 11 by screws b1.

The first housing 11 is formed in a substantially cylindrical shape using a metal material, and includes the sprocket 11a, a cylindrical part 11b, an inner peripheral surface 11c, an annular bottom wall surface 11d, an oil passage 11e, an oil passage 11f, an advance angle side stopper 11g, a retard angle side stopper 11h, and a plurality of screw holes 11j for screwing the screws b1.

The inner peripheral surface 11c slidably contacts an outer peripheral surface 21a of the first internal gear 20 so that the first housing 11 is rotatably supported around the axis S. The bottom wall surface 11d slidably contacts the outer peripheral area of a joint surface 22b of the first internal gear 20 so that the first housing 11 is positioned in the direction of the axis S. The oil passage 11e is formed in a groove shape extending parallel to the axis S on the inner peripheral surface 11c, and guides the lubricating oil guided to the inside of the first internal gear 20 through the oil passage 2c of the camshaft 2 and an oil passage 35 of the rotor 30 to a sliding area between the outer peripheral surface 21a of the first internal gear 20 and the inner peripheral surface 11c. The oil passage 11f is formed in a groove shape extending in a radial direction on a front end surface of the cylindrical part 11b, and guides the lubricating oil guided into the housing rotor 10 to the outside of the housing rotor 10. The advance angle side stopper 11g is brought into contact with an advance angle side contact part 36 of the rotor 30 to position the camshaft 2 at a maximum advance angle position. The retard angle side stopper 11h is brought into contact with a retard angle side contact part 37 of the rotor 30 to position the camshaft 2 at a maximum retard angle position.

The second housing 12 is formed in a disk shape using a metal material, and includes a circular opening 12a centered on the axis S, a plurality of circular holes 12b through which the screws b1 pass, and an inner wall surface 12c opposed to an end part 42b of the external gear 40 in the direction of the axis S. The opening 12a leaves a gap around the rotation member 70 in the radial direction to expose a connection part 72 of the rotation member 70. The inner wall surface 12c is formed as a flat surface perpendicular to the axis S so that the end part 42b of the external gear 40 can be opposed to and come into contact with the inner wall surface 12c from the direction of the axis S. That is, the second housing 12 functions as a part of the housing rotor 10 and also functions as a cover member arranged adjacent to the second internal gear 50 on the side opposite to the first internal gear 20 and covering the external gear 40.

Then, after the first internal gear 20 fitted with the rotor 30, the second internal gear 50, the external gear 40, and the rotation member 70 fitted with the bearing 60 are assembled to the first housing 11, the second housing 12 is joined to the first housing 11 by the screws b1, thereby forming the housing rotor 10 that rotates around the axis S.

Here, since the housing rotor 10 is rotatably supported around the axis S via the first internal gear 20, the housing rotor 10, the external gear 40, and the second internal gear 50 can be positioned with reference to the first internal gear 20 fixed to the camshaft 2. Further, the configuration including the first housing 11 and the second housing 12 is used as the housing rotor 10, and by housing the above-mentioned various parts and joining the second housing 12 to the first housing 11, the valve timing changing device M can be easily assembled.

Figure 6:
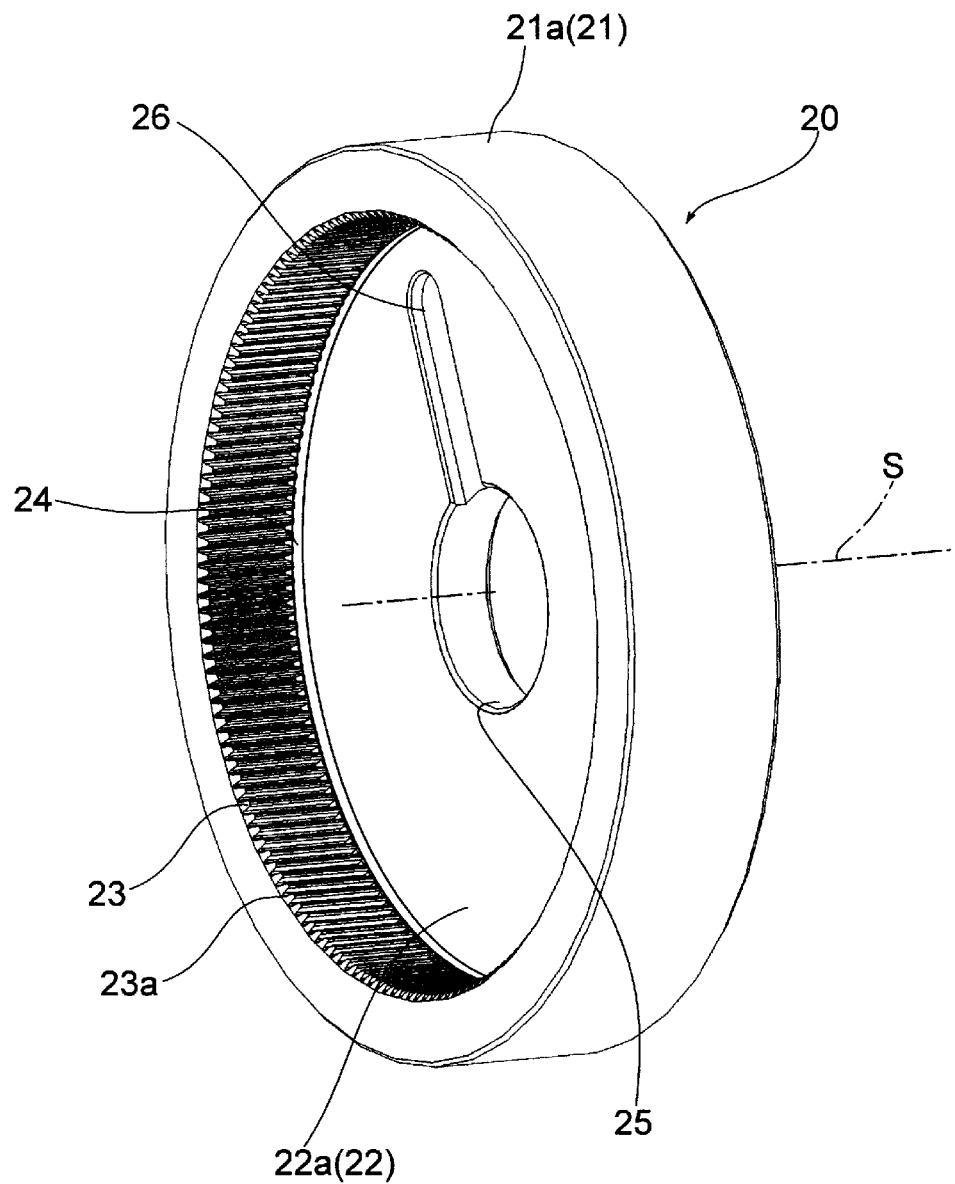
FIG. 6 is an external perspective view showing the bottomed cylindrical first internal gear included in the strain wave gear unit of the invention.
Figure 7:
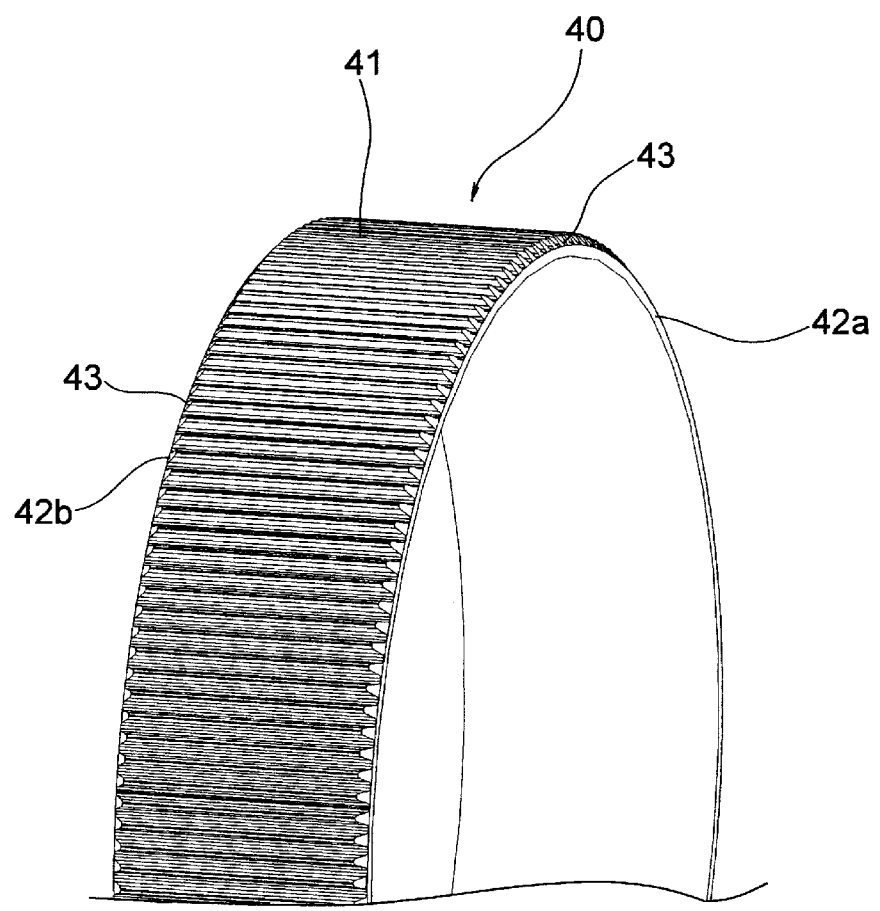
FIG. 7 is a partial perspective view partially showing the cylindrical external gear included in the strain wave gear unit of the invention.

As shown in FIG. 4 and FIG. 6, the first internal gear 20 is formed in a bottomed cylindrical shape integrally having the cylindrical part 21 and the bottom wall part 22 by processing using a metal material, and includes internal teeth 23, a teeth-non-formed part 24, a fitting hole 25, and an oil passage 26.

The cylindrical part 21 defines an outer peripheral surface 21a centered on the axis S so as to slidably contact the inner peripheral surface 11c of the first housing 11. The bottom wall part 22 is formed as a flat wall perpendicular to the axis S and defines an inner wall surface 22a that an end part 42a of the external gear 40 contacts and functions as a seating surface of a fastening bolt b2, and the joint surface 22b to which the rotor 30 is joined. The internal teeth 23 form a tooth row having a tooth number Z1 formed by arranging the teeth in an annular shape centered on the axis S on the inner peripheral surface of the cylindrical part 21. Then, the internal teeth 23 mesh with the back side area of substantially half of the external teeth 41 of the external gear 40 in the direction of the axis S. Here, the "back side" is the right side in the direction of the axis S in FIG. 8, that is, the side on which the camshaft 2 is arranged.

Figure 8:
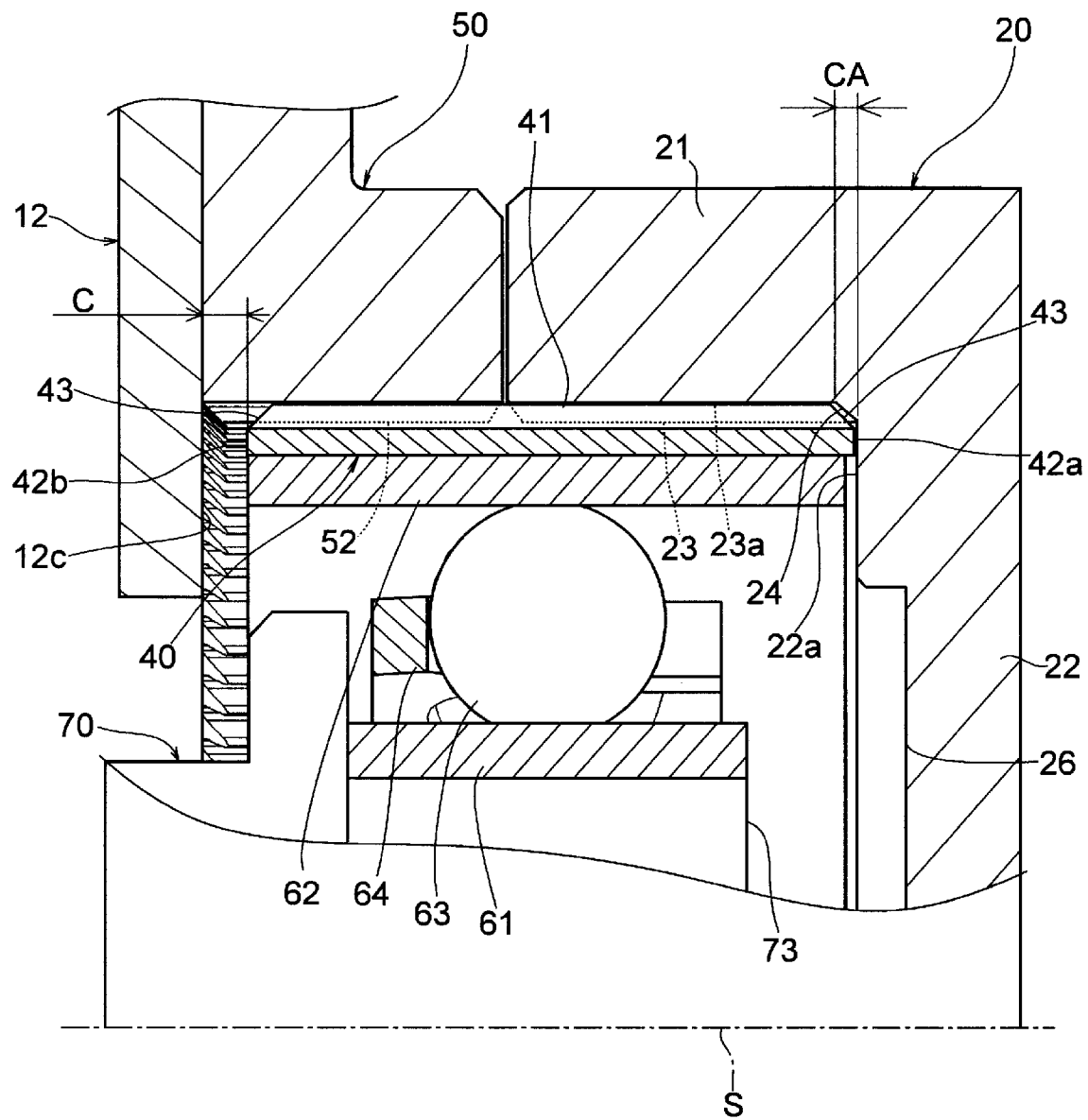
FIG. 8 is a partial cross-sectional view showing the relationship between the external gear, the opposed part of the external gear, the bottomed cylindrical first internal gear, the teeth-non-formed part of the first internal gear, and the cylindrical second internal gear included in the strain wave gear unit of the invention.

As shown in FIG. 6 and FIG. 8, the teeth-non-formed part 24 is an area where the internal teeth 23 are not formed or an area including an incomplete tooth form that does not form a complete tooth form in the corner area CA where the bottom wall part 22 is integrally continuous with the cylindrical part 21, and is an annular convex part that protrudes farther inward than a tooth bottom 23a of the internal teeth 23 and has an inclined cross section with an inner diameter decreasing toward the bottom wall part 22. The teeth-non-formed part 24 is a remaining area that cannot be cut by a cutting blade when the internal teeth 23 are formed by cutting processing.

The fitting hole 25 has a circular shape centered on the axis S so that a tubular fitting part 32 of the rotor 30 is fitted thereinto. The oil passage 26 is formed as a groove extending in the radial direction on the inner wall surface 22a of the bottom wall part 22, and supplies the lubricating oil guided to the inside of the first internal gear 20 through the oil passage 35 of the rotor 30 and the inner side of the tubular fitting part 32 to the bearing 70, the end part 42a of the external gear 40, a meshing area between the external teeth 41 of the external gear 40 and the internal teeth 23 and 52, and the end part 42b of the external gear 40. By providing the oil passage 26 in this way, the wear and deterioration of the meshing area and the contact area of the external gear 40 can be suppressed, and a smooth operation can be obtained.

As shown in FIG. 4 and FIG. 5, the rotor 30 is formed in a substantially flat plate shape using a metal material, and includes a through hole 31, the tubular fitting part 32, a fitting concave part 33, a positioning hole 34, the oil passage 35, the advance angle side contact part 36, and the retard angle side contact part 37.

The through hole 31 has a circular shape centered on the axis S for disposing the fastening bolt b2 through with a gap through which the lubricating oil flows. The tubular fitting part 32 defines a part of the through hole 31, and has a cylindrical shape centered on the axis S so as to be fitted into the fitting hole 25 of the first internal gear 20 or not to block the oil passage 26 in a fitted state. The fitting concave part 33 has a circular shape centered on the axis S so as to fit the fitting part 2a of the camshaft 2.

The positioning hole 34 is formed so that the positioning pin P fixed into the fitting hole 2d of the camshaft 2 is fitted thereinto, and serves to position the angular position around the axis S. The oil passage 35 is formed as a groove that extends in the radial direction and communicates with the through hole 31 and communicates with the oil passage 2c of the camshaft 2 on the bottom wall surface of the fitting concave part 33, and guides the lubricating oil supplied from the oil passage 2c of the camshaft 2 into the first internal gear 20 through the through hole 31.

The advance angle side contact part 36 comes into contact with the advance angle side stopper 11g of the first housing 11 in a detachable manner. The retard angle side contact part 37 comes into contact with the retard angle side stopper 11h of the first housing 11 in a detachable manner.

Then, the rotor 30 is integrally assembled with the first internal gear 20 in advance by fitting the tubular fitting part 32 to the fitting hole 25. Subsequently, with the first housing 11 rotatably attached to the first internal gear 20, the rotor 30 is brought close to the camshaft 2, the positioning pin P is fitted into the positioning hole 34, and the fitting part 2a is fitted into the fitting concave part 33. As a result, the rotor 30 is joined to the camshaft 2. Thereafter, the fastening bolt b2 is screwed into the screw hole 2b through the through hole 31, thereby fixing the first internal gear 20 to the camshaft 2 via the rotor 30.

Further, the rotor 30 is positioned at the maximum advance angle position when the advance angle side contact part 36 comes into contact with the advance angle side stopper 11g, and is positioned at the maximum retard angle position when the retard angle side contact part 37 comes into contact with the retard angle side stopper 11h. That is, the rotation range of the camshaft 2 relative to the housing rotor 10 is regulated via the rotor 30. Thereby, the range of the rotation phase in which the valve timing can be changed, that is, the adjustable angle range from the maximum retard angle position to the maximum advance angle position can be regulated to a desired range.

Here, by using the rotor 30, when the shape of the fitting part 2a of the camshaft 2 differs according to the specifications of the engines, the valve timing changing device M can be applied to various engines simply by setting the rotor 30 corresponding to various camshafts 2.

As shown in FIG. 4, FIG. 5, FIG. 7, and FIG. 8, the external gear 40 is formed in a thin cylindrical shape that is elastically deformable using a metal material, and includes the external teeth 41 on the outer peripheral surface, the end parts 42a and 42b that define the width dimension in the direction of the axis S, and the opposed parts 43 and 43 in the outer peripheral areas on both sides in the width direction.

The external teeth 41 form a tooth row having a tooth number Z2 different from the tooth number Z1 of the first internal teeth 20, formed by arranging the teeth in an annular shape centered on the axis S on the outer peripheral surface of the external gear 40. Then, the back side area of substantially half of the external teeth 41 in the direction of the axis S meshes with the internal teeth 23 of the first internal gear 20, and the front side area of substantially half of the external teeth 41 in the direction of the axis S meshes with the internal teeth 52 of the second internal gear 50. Here, the "front side" is the left side in the direction of the axis S in FIG. 8, that is, the side on which the electric motor is arranged and which is opposite to the side on which the camshaft 2 is arranged. The "back side" is the right side in the direction of the axis S in FIG. 8. The end part 42a has an annular flat surface perpendicular to the axis S, and is opposed to the inner wall surface 22a of the bottom wall part 22 of the first internal gear 20 in the direction of the axis S so as to contact the inner wall surface 22a. The end part 42b has an annular flat surface perpendicular to the axis S, and is opposed to the inner wall surface 12c of the second housing 12 in the direction of the axis S so as to contact the inner wall surface 12c. In addition, the external gear 40 may be assembled with the end part 42b opposed to the bottom wall part 22 and the end part 42a opposed to the inner wall surface 12c.

The opposed part 43 is formed by thinning the outer peripheral area of the external gear 40 so as to be opposed to the teeth-non-formed part 24 of the first internal gear with a predetermined gap, that is, have an outer diameter smaller than the inner diameter of the teeth-non-formed part 24, in a state where the end part 42a or the end part 42b is in contact with the inner wall surface 22a of the bottom wall part 22. Here, when the external gear 40 is formed, by performing staggering processing during trimming processing such as deburring, the opposed part 43 is formed on a conical inclined surface with an outer diameter decreasing toward the end parts 42a and 42b in the width direction at the same time as the finishing processing.

Then, the external gear 40 is deformed in an oval shape under the cam action of a cam part 73 of the rotation member 70 via the bearing 60, and partially meshes with the first internal gear 20 at two points and partially meshes with the second internal gear 50 at two points.

As described above, the external gear 40 is provided with the opposed part 43 in the vicinity of the end part 42a and the opposed part 43 in the vicinity of the end part 42b. Accordingly, the external gear 40 may be assembled so that the end part 42b of the external gear 40 is opposed to the bottom wall part 22 of the first internal gear 20. Therefore, erroneous assembly of the external gear 40 can be prevented.

Further, in a state where the end part 42a of the external gear 40 is in contact with the bottom wall part 22 of the first internal gear 20, the opposed part 43 is opposed to the teeth-non-formed part 24 with a gap so interference between the external teeth 41 and the teeth-non-formed part 24 can be prevented. Therefore, as compared with the case where a spacer member or the like is interposed between the end part 42a and the bottom wall part 22 to prevent interference between the external teeth 41 and the teeth-non-formed part 24, the number of parts can be reduced, and the width of the dimensions in the direction of the axis S can be narrowed.

As shown in FIG. 3 to FIG. 5, the second internal gear 50 is formed in a substantially cylindrical or annular shape using a metal material, and includes a cylindrical part 51 centered on the axis S, internal teeth 52, a collar part 53, and a plurality of circular holes 54 through which the screws b1 pass. The cylindrical part 51 is formed to have an outer diameter dimension that is fitted into the inner peripheral surface 11c of the first housing 11. The internal teeth 52 form a tooth row having a tooth number Z3 formed by arranging the teeth in an annular shape centered on the axis S on the inner peripheral surface of the cylindrical part 21. Then, the internal teeth 52 mesh with the front side area of substantially half of the external teeth 41 of the external gear 40 in the direction of the axis S.

Here, the tooth number Z3 of the internal teeth 52 is set to be the same as the tooth number Z2 of the internal teeth 41 of the external gear 40. By setting the tooth numbers Z3 and Z2 to be the same (Z3=Z2) in this way, the gear ratio (for example, reduction ratio) at the time of changing the rotation phase can be easily set simply with the tooth number Z1 of the first internal gear 20 and the tooth number Z2 of the external gear 40.

The collar part 53 is formed in a flat plate shape perpendicular to the axis S, and is sandwiched and assembled between the first housing 11 and the second housing 12. That is, the second internal gear 50 is fixed by the screws b1 so as to rotate integrally with the housing rotor 10, and meshes with the external gear 40.

In the above configuration, as shown in FIG. 8, the external gear 40 is arranged with a gap C between the inner wall surface 22a of the bottom wall part 22 of the first internal gear 20 and the inner wall surface 12c of the second housing 12 in the direction of the axis S. That is, in the direction of the axis S, the width dimension of the external gear 40 is set smaller than the separation dimension between the bottom wall part 22 of the first internal gear 20 and the inner wall surface 12c of the second housing 12 serving as the cover member. As a result, since the external gear 40 can be prevented from contacting both the bottom wall part 22 and the inner wall surface 12c at the same time, the sliding resistance can be reduced.

As shown in FIG. 3 and FIG. 8, the bearing 60 includes an annular inner ring 61, an annular outer ring 62, a plurality of rolling elements 63 rollably arranged between the inner ring 61 and the outer ring 62, and a retainer 64 for holding the plurality of rolling elements 63.

The inner ring 61 is formed in the shape of an endless belt that is elastically deformable using a metal material, and the cam part 73 of the rotation member 70 is fitted thereinto. The outer ring 62 is formed in the shape of an endless belt that is elastically deformable using a metal material, and is fitted inside the external gear 40. The plurality of rolling elements 63 are formed into spheres using a metal material, and are sandwiched between the inner ring 61 and the outer ring 62 and are held at equal intervals around the axis S by the retainer 64. The retainer 64 is formed in the shape of an endless belt that is elastically deformable using a metal material, and holds the plurality of rolling elements 63 rollably at equal intervals.

Then, the inner ring 61 and the outer ring 62 of the bearing 60 are deformed in an oval shape along the cam part 73 of the rotation member 70. Since the bearing 70 is interposed between the cam part 73 of the rotation member 70 and the external gear 40 in a state of being deformed in an oval shape, the external gear 40 can be smoothly deformed in an oval shape as the rotation member 70 rotates.

As shown in FIG. 3 to FIG. 5, the rotation member 70 is formed in a substantially cylindrical shape using a metal material, and includes an annular part 71, the connection part 72, and the cam part 73. The annular part 71 has an annular shape centered on the axis S. The connection part 72 is formed on the inner side of the annular part 71 as a U-shaped groove that opens toward the radial center perpendicular to the axis S, and is connected to the rotation shaft of the electric motor. The cam part 73 is formed in an oval ring shape whose outer peripheral surface defines an oval shape having a major axis in a linear direction perpendicular to the axis S, and exerts the cam action for generating elliptical deformation on the external gear 40. Here, since the annular part 71 and the cam part 73 are joined by a screw, the annular part 71 or the cam part 73 can be replaced according to the specifications. Further, the connection part 72 may be formed in a fragile shape so as to cut off the transmission of the rotational force with the rotation shaft when an excessive load occurs, and the annular part 71 may be formed of a resin material.

Then, the rotation member 70 receives the rotational force of the electric motor so that the cam part 73 exerts the cam action on the external gear 40. As a result, the external gear 40 in the state of meshing with the first internal gear 20 and the second internal gear 50 is deformed in an oval shape and its meshing position continuously changes around the axis S.

The relationship between the first internal gear 20, the external gear 40, and the second internal gear 50 in the above configuration will be described. Since the relationship between the tooth number Z1 of the first internal gear 20 and the tooth number Z2 of the external gear 40 causes relative rotation, it is set that when the number of meshing points of the first internal gear 20 and the external gear 40 is N and a positive integer is n, the relationship of $Z2=Z1\pm n\cdot N$ is established. In this embodiment, since N=2, for example, Z1=162 and Z2=160 are set. Further, as for the relationship between the tooth number Z3 of the second internal gear 50 and the tooth number Z2 of the external gear 40, the same value is selected so as to rotate them in the same phase without causing relative rotation as described above. In this embodiment, for example, Z3=160 and Z2=160 are set. Accordingly, since the reduction ratio can be determined simply by the tooth number Z1 of the first internal gear 20 and the tooth number Z2 of the external gear 40, it is easy to set the reduction ratio. In addition, the tooth number Z3 of the second internal gear 50 may not be the same as the tooth number Z2 of the external gear 40 and may be a different value.

Next, the assembly work of the valve timing changing device M having the above configuration will be described. When assembling, the first housing 11, the second housing 12, the screws b1, the first internal gear 20, the rotor 30, the external gear 40, the second internal gear 50, the bearing 60, and the rotation member 70 are prepared.

First, the bearing 60 and the external gear 40 are assembled to the rotation member 70. Subsequently, the rotor 30 is joined to the first internal gear 20 and integrally assembled. Subsequently, the first internal gear 20 is fitted into the first housing 11, and the rotation member 70 is fitted so that the back side part of the tooth row 41 of the external gear 40 meshes with the internal teeth 23 of the first internal gear 20. Subsequently, the second internal gear 50 is fitted so that the internal teeth 52 mesh with the front side part of the internal teeth 41 of the external gear 40, and the second housing 12 is arranged from the outer front side thereof.

Then, the screws b1 are screwed into the screw holes 11j through the circular holes 12b and 54, whereby the second housing 12 is joined to the first housing 11 with the second internal gear 50 sandwiched between them. As a result, the assembly of the valve timing changing device M is completed. Further, in this assembled state, the connection part 72 of the rotation member 70 is exposed through the opening 12a of the housing rotor 10. However, the assembly work is not limited to the above procedure, and other procedures may be adopted. The valve timing changing device M having the above configuration can simplify the structure, reduce the size, reduce the number of parts, and lower the cost.

Next, the operation when the above valve timing changing device M is applied to the engine will be described. First, if the phase is not changed, that is, the valve timing is not changed, the electric motor is driven and controlled so as to exert a rotational driving force on the rotation member 70 in the same direction as the camshaft 2 at the same rotational speed as the rotational speed of the camshaft 2. Accordingly, the first internal gear 20 and the external gear 40 are locked at the position where they mesh with each other. Further, the external gear 40 and the second internal gear 50 are locked at the position where they mesh with each other. As a result, the camshaft 2 and the housing rotor 10 rotate integrally in one direction (the R direction in FIG. 1) around the axis S.

On the other hand, if the phase is changed, that is, the valve timing is changed, the electric motor is driven and controlled so as to exert a rotational driving force on the rotation member 70 in the same direction as the camshaft 2 at a rotational speed different from the rotational speed of the camshaft 2. For example, when the electric motor is driven and controlled so as to exert a rotational driving force on the rotation member 70 in the same direction as the camshaft 2 at a rotational speed faster than the rotational speed of the camshaft 2, the rotation member 70 is relatively rotated in one direction around the axis S, and the cam part 73 of the rotation member 70 exerts a cam action on the external gear 40 while rotating in one direction. Then, when the rotation member 70 makes one rotation in one direction, the external gear 40 causes a rotation difference with respect to the first internal gear 20 by the tooth number difference (162−160), and shifts in the other direction. On the other hand, even if the rotation member 70 rotates in one direction, the tooth number Z2 of the external gear 40 and the tooth number Z3 of the second internal gear 50 are the same so the same phase is maintained.

That is, the rotation member 70 is relatively rotated in one direction, whereby the rotation phase of the camshaft 2 is advanced with respect to the housing rotor 10, and the opening/closing timing of the intake valve or the exhaust valve is changed to the advance angle side.

On the other hand, when the electric motor is driven and controlled so as to exert a rotational driving force on the rotation member 70 in the same direction as the camshaft 2 at a rotational speed slower than the rotational speed of the camshaft 2, the rotation member 70 is relatively rotated in the other direction around the axis S, whereby the cam part 73 of the rotation member 70 exerts a cam action on the external gear 40 while rotating in the other direction. Then, when the rotation member 70 makes one rotation in the other direction, the external gear 40 causes a rotation difference with respect to the first internal gear 20 by the tooth number difference (162−160), and shifts in one direction. On the other hand, even if the rotation member 70 rotates in the other direction, the tooth number Z2 of the external gear 40 and the tooth number Z3 of the second internal gear 50 are the same so the same phase is maintained.

That is, the rotation member 70 is relatively rotated in the other direction, whereby the rotation phase of the camshaft 2 is retarded with respect to the housing rotor 10, and the opening/closing timing of the intake valve or the exhaust valve is changed to the retard angle side.

In this changing operation, the external gear 40 moves in the direction of the axis S due to the thrust force generated by the difference in the meshing state between the internal teeth 23 and the internal teeth 52 with respect to the external teeth 41 of the external gear 40. When the external gear 40 moves toward the back side in the direction of the axis S and the end part 42a comes into contact with the bottom wall part 22 of the first internal gear 20, since the opposed part 43 is opposed to the teeth-non-formed part 24 with a gap, interference between the external teeth 41 and the teeth-non-formed part 24 can be prevented. As a result, the external teeth 41 of the external gear 40 can normally mesh with the internal teeth 23 of the first internal gear 20 and rotate smoothly. On the other hand, even if the external gear 40 moves toward the front side in the direction of the axis S and the end part 42b comes into contact with the inner wall surface 12c of the second housing 12, since the second internal gear 50 has no teeth-non-formed part, the external teeth 41 of the external gear 40 can normally mesh with the internal teeth 52 of the second internal gear 50 and rotate smoothly.

Further, as shown in FIG. 8, since the external gear 40 is arranged with the gap C between the bottom wall part 22 (inner wall surface 22a) of the first internal gear 20 and the inner wall surface 12c of the second housing 12, the external gear 40 does not contact both the bottom wall part 22 and the inner wall surface 12c at the same time, and the sliding resistance can be reduced correspondingly. In addition, in the above valve timing changing device M, the lubricating oil stored in an oil pan of the engine is supplied to the camshaft 2 by an oil pump or the like, and is guided to the inside of the first internal gear 20 through the oil passage 2c, the oil passage 35, and the through hole 31, and supplied to the bearing 60 and the meshing area of the external teeth 41 of the external gear 40 and the internal teeth 23 and 52 through the oil passage 26. Then, the lubricating oil is guided to the outside of the housing rotor 10 through the opening 12a and the oil passage 11f, flows inside the cover member of the engine, and is returned to the oil pan. As described above, since the lubrication action is surely performed, the wear and deterioration of the sliding area and the meshing area of the external gear 40 can be suppressed, and the valve timing can be smoothly changed.

The above embodiment shows a configuration that the cylindrical second internal gear 50 is used as the second internal gear, and the second housing 12 is used as the cover member adjacent to the second internal gear 50, but the invention is not limited thereto. For example, as the second internal gear, a bottomed cylindrical second internal gear may be used, which has a teeth-non-formed part that protrudes farther inward than the tooth bottom of the internal teeth in the corner area where the bottom wall part is integrally continuous with the internal teeth formed on the cylindrical part and the cylindrical part so as to serve as the second housing as well. In this case, the end part 42b of the external gear 40 is opposed to the bottom wall part of the second internal gear so as to contact the bottom wall part, and the opposed part 43 formed in the vicinity of the end part 42b functions to be opposed to the teeth-non-formed part of the second internal gear with a gap.

Figure 9:
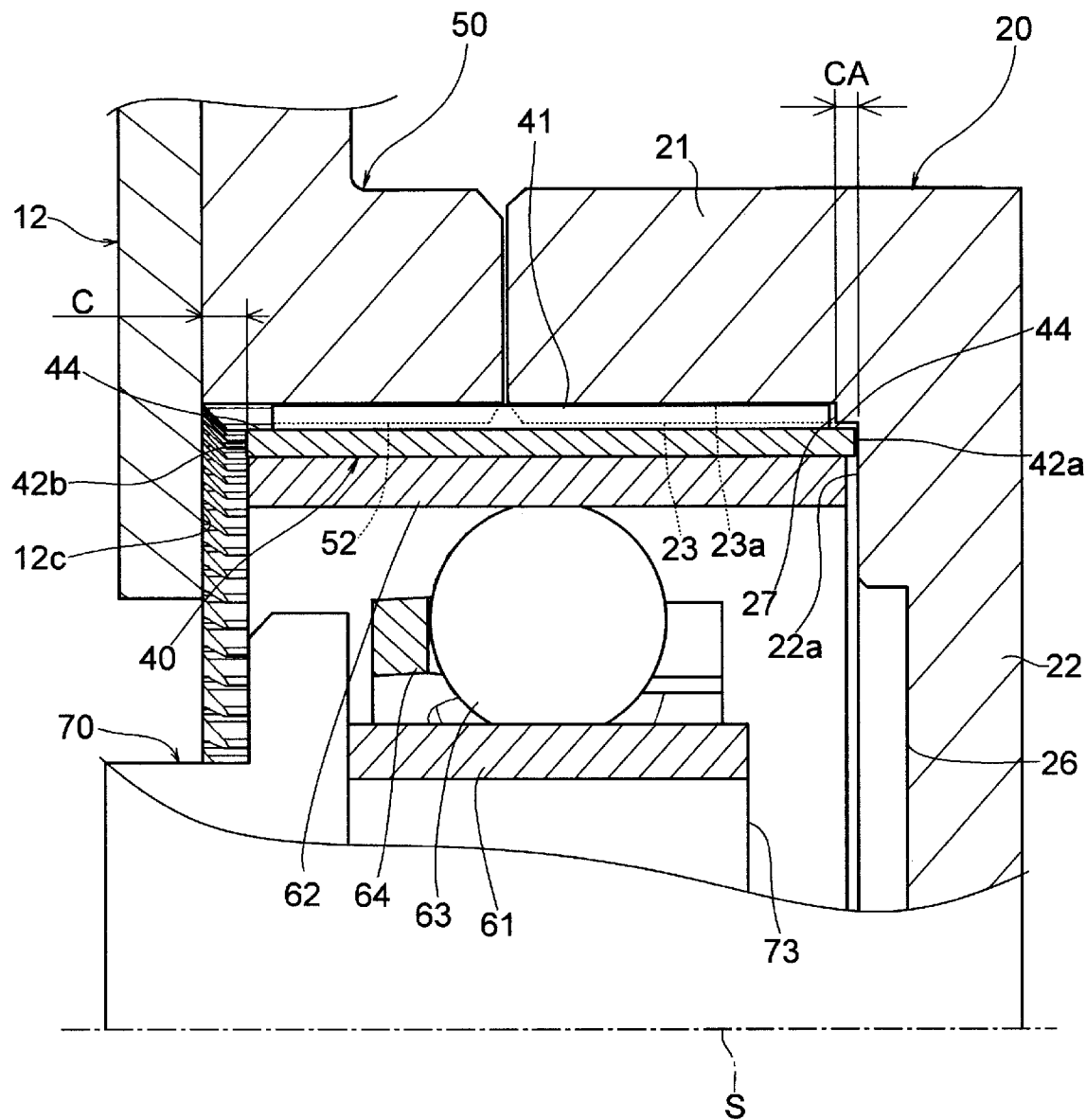
FIG. 9 is a partial cross-sectional view showing a modified example of the opposed part of the external gear and the teeth-non-formed part of the first internal gear shown in FIG. 8.

FIG. 9 shows a modified example of the teeth-non-formed part 24 of the first internal gear 20 and a modified example of the opposed part 43 of the external gear 40. In this modified example, the first internal gear 20 includes a teeth-non-formed part 27 instead of the teeth-non-formed part 24. Further, the external gear 40 includes an opposed part 44 instead of the opposed part 43.

The teeth-non-formed part 27 is a remaining area that cannot be cut by the cutting blade when the internal teeth 23 are formed by cutting processing, and is an annular convex part having a rectangular cross section that protrudes farther inward than the tooth bottom 23a of the internal teeth 23.

The opposed part 44 is formed by thinning the outer peripheral area of the external gear 40 so as to be opposed to the teeth-non-formed part 27 of the first internal gear 20 with a predetermined gap, that is, have an outer diameter smaller than the inner diameter of the teeth-non-formed part 27, in a state where the end part 42a or the end part 42b is in contact with the inner wall surface 22a of the bottom wall part 22. Here, when the external gear 40 is formed, by performing cutting processing on the outer peripheral area, the opposed part 43 is formed on a cylindrical surface with an outer diameter smaller than the external teeth 41.

In this modified example, in a state where the end part 42a of the external gear 40 is in contact with the bottom wall part 22 of the first internal gear 20, the opposed part 44 is opposed to the teeth-non-formed part 27 with a gap so interference between the external teeth 41 and the teeth-non-formed part 27 can be prevented. Therefore, same as described above, as compared with the case where a spacer member or the like is interposed between the end part 42a and the bottom wall part 22 to prevent interference between the external teeth 41 and the teeth-non-formed part 27, the number of parts can be reduced, and the width of the dimensions in the direction of the axis S can be narrowed.

Figure 10:
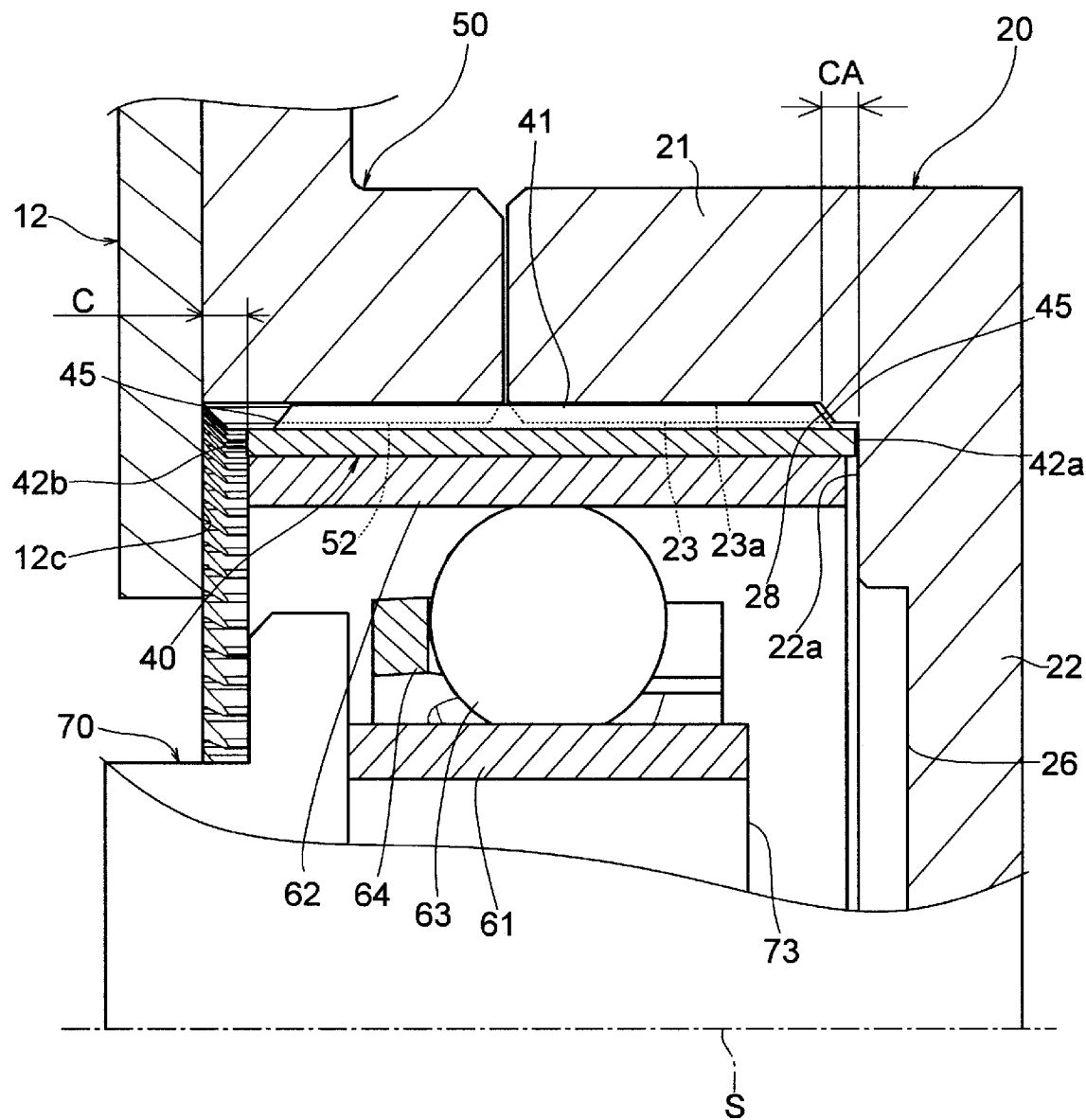
FIG. 10 is a partial cross-sectional view showing another modified example of the opposed part of the external gear and the teeth-non-formed part of the first internal gear shown in FIG. 8.
Figure 11:
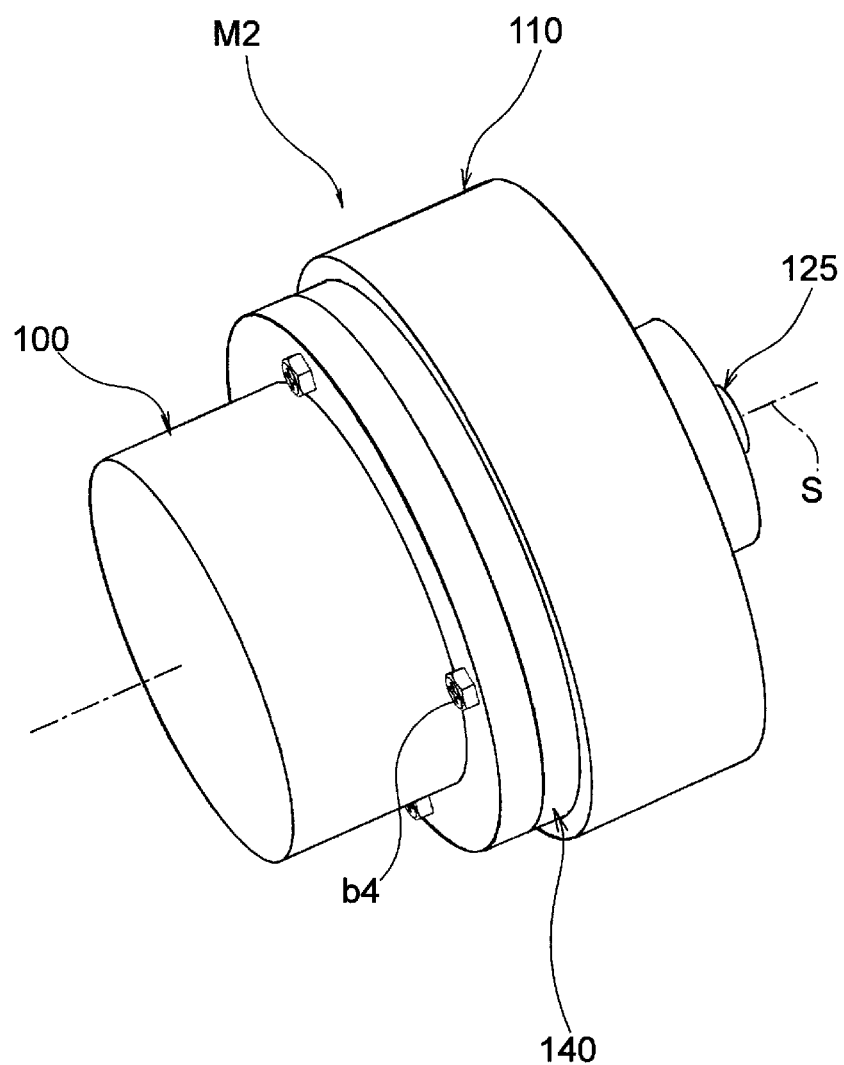
FIG. 11 is an external perspective view of the gear transmission device using the strain wave gear unit according to an embodiment of the invention as viewed obliquely from the front.
Figure 12:
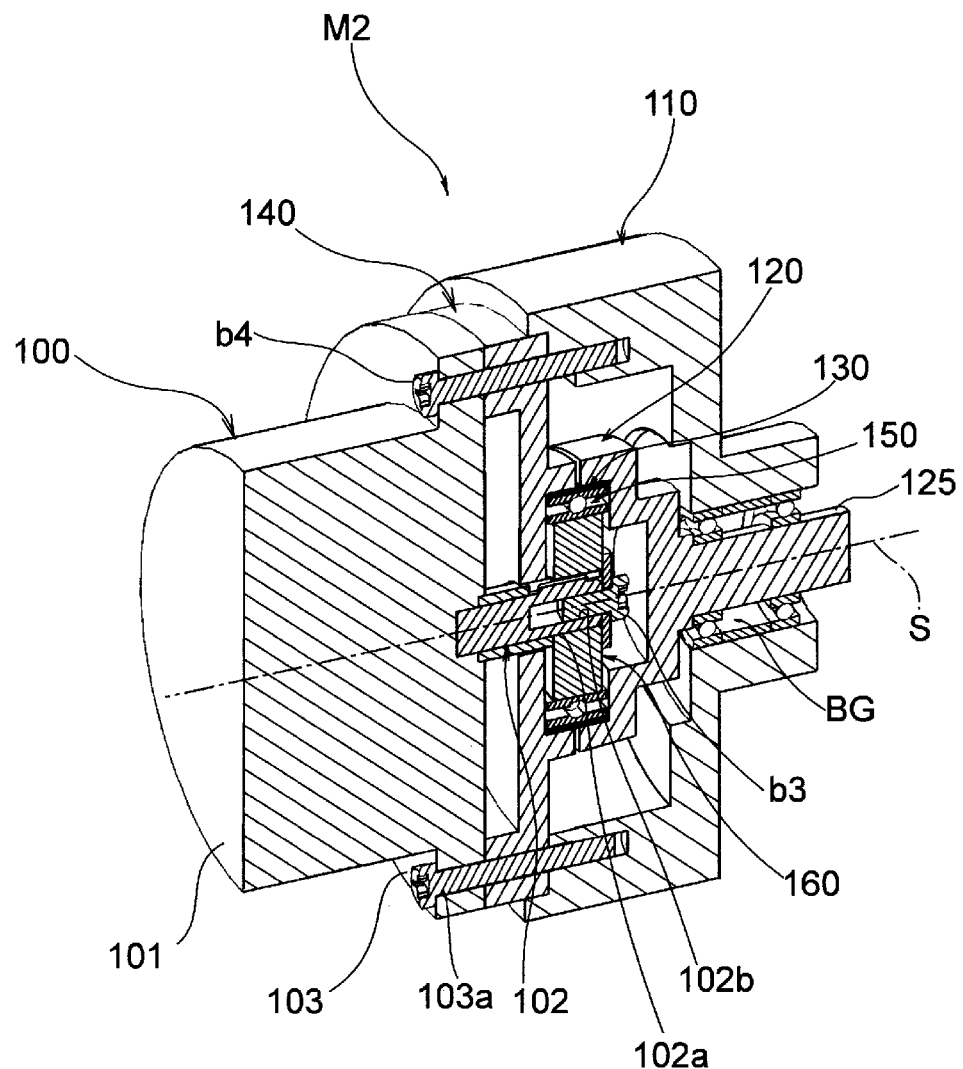
FIG. 12 is a perspective cross-sectional view of the gear transmission device shown in FIG. 11.

FIG. 10 shows another modified example of the teeth-non-formed part 24 of the first internal gear 20 and another modified example of the opposed part 43 of the external gear 40. In this modified example, the first internal gear 20 includes a teeth-non-formed part 28 instead of the teeth-non-formed part 24. Further, the external gear 40 includes an opposed part 45 instead of the opposed part 43.

The teeth-non-formed part 28 is a remaining area that cannot be cut by the cutting blade when the internal teeth 23 are formed by cutting processing, and is an annular convex part that protrudes farther inward than the tooth bottom 23a of the internal teeth 23 and has a cross section combining an inclined cross section and a rectangular cross section, wherein the inclined cross section has an outer diameter that decreases toward the bottom wall part 22.

The opposed part 45 is formed by thinning the outer peripheral area of the external gear 40 so as to be opposed to the teeth-non-formed part 28 of the first internal gear 20 with a predetermined gap, that is, have an outer diameter smaller than the inner diameter of the teeth-non-formed part 28, in a state where the end part 42a or the end part 42b is in contact with the inner wall surface 22a of the bottom wall part 22. Here, when the external gear 40 is formed, by performing cutting processing on the outer peripheral area, the opposed part 45 is formed on a conical inclined surface with an outer diameter decreasing toward the end parts 42a and 42b in the width direction and on a cylindrical surface that is continuous with the inclined surface and has an outer diameter smaller than the external teeth 41.

In this modified example, in a state where the end part 42a of the external gear 40 is in contact with the bottom wall part 22 of the first internal gear 20, the opposed part 45 is opposed to the teeth-non-formed part 28 with a gap so interference between the external teeth 41 and the teeth-non-formed part 28 can be prevented. Therefore, same as described above, as compared with the case where a spacer member or the like is interposed between the end part 42a and the bottom wall part 22 to prevent interference between the external teeth 41 and the teeth-non-formed part 28, the number of parts can be reduced, and the width of the dimensions in the direction of the axis S can be narrowed.

FIG. 11 to FIG. 16 show a gear transmission device M2 according to an embodiment. The gear transmission device M2 according to an embodiment includes an electric motor 100 having an input shaft 102, a housing 110, a first internal gear 120 having an output shaft 125, an external gear 130, a second internal gear 140, a bearing 150, and a rotation member 160. Here, a strain wave gear unit is composed of the first internal gear 120, the external gear 130, the second internal gear 140, and the rotation member 160.

Figure 15:
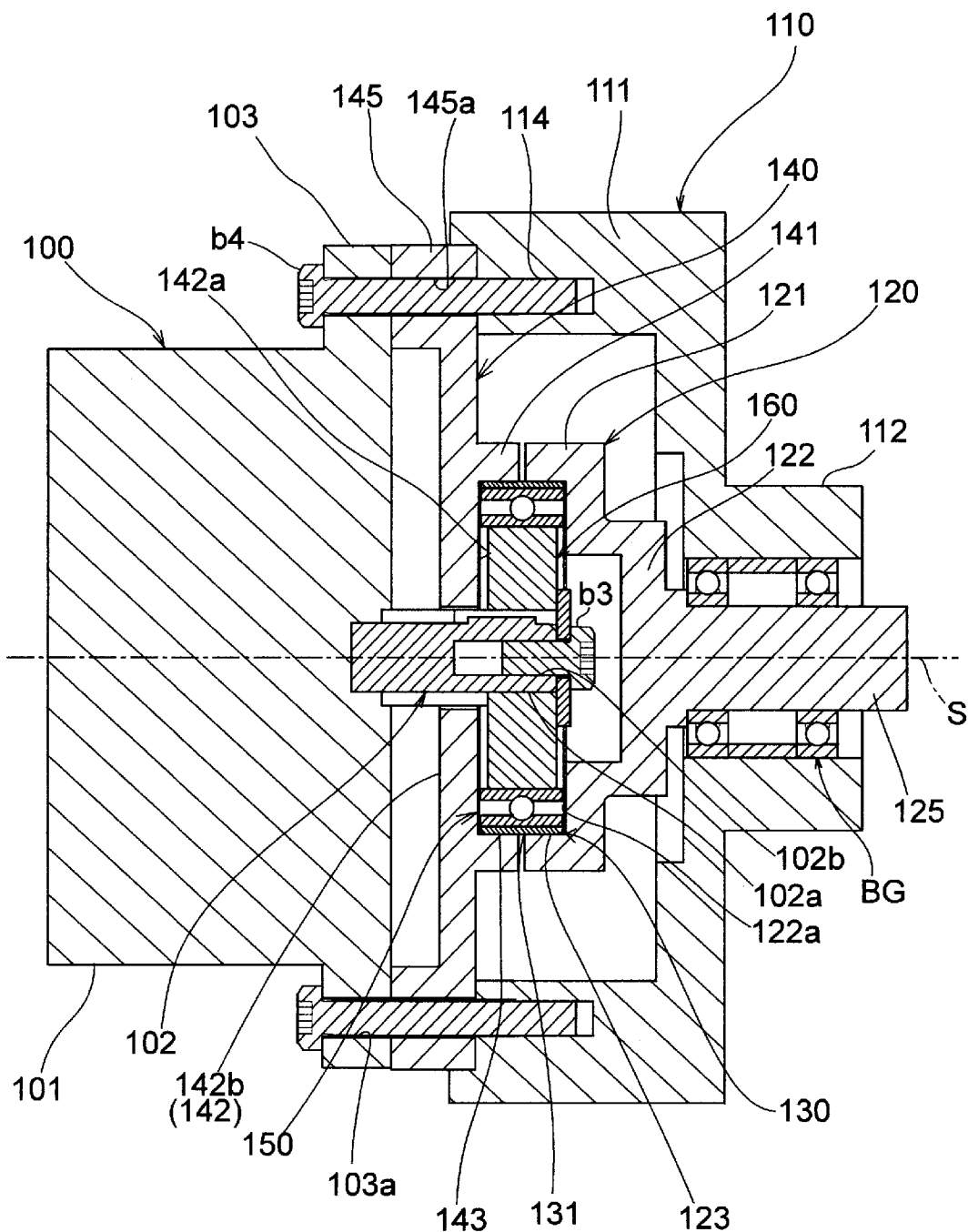
FIG. 15 is a cross-sectional view taken along the axis of the gear transmission device shown in FIG. 11.

As shown in FIG. 15, the electric motor 100 includes a main body 101, the input shaft 102 rotationally driven by the main body 101, and a flange part 103. The main body 101 has a magnet, a coil for excitation, and a rotor. The input shaft 102 has a fitting part 102a that extends on the axis S and protrudes from the main body 101 for fitting the rotation member 160, and a screw hole 102b for screwing a fastening bolt b3 provided with a washer W to fix the rotation member 160. The flange part 103 is formed as an annular flat surface perpendicular to the axis S, and includes a circular hole 103a through which a screw b4 passes. Then, the flange part 103 is joined to a collar part 145 of the second internal gear 140.

The housing 110 is formed in a bottomed cylindrical shape centered on the axis S, and includes a cylindrical part 111, a support part 112, a fitting concave part 113, and a screw hole 114. The cylindrical part 111 has a cylindrical shape centered on the axis S so as to rotatably house the first internal gear 120 around the axis S. The support part 112 is formed in a cylindrical shape centered on the axis S, and rotatably supports the output shaft 125 of the first internal gear 120 around the axis S via a bearing BG. The fitting concave part 113 forms an annular concave part centered on the axis S to fit and fix the collar part 145 of the second internal gear 140.

Figure 13:
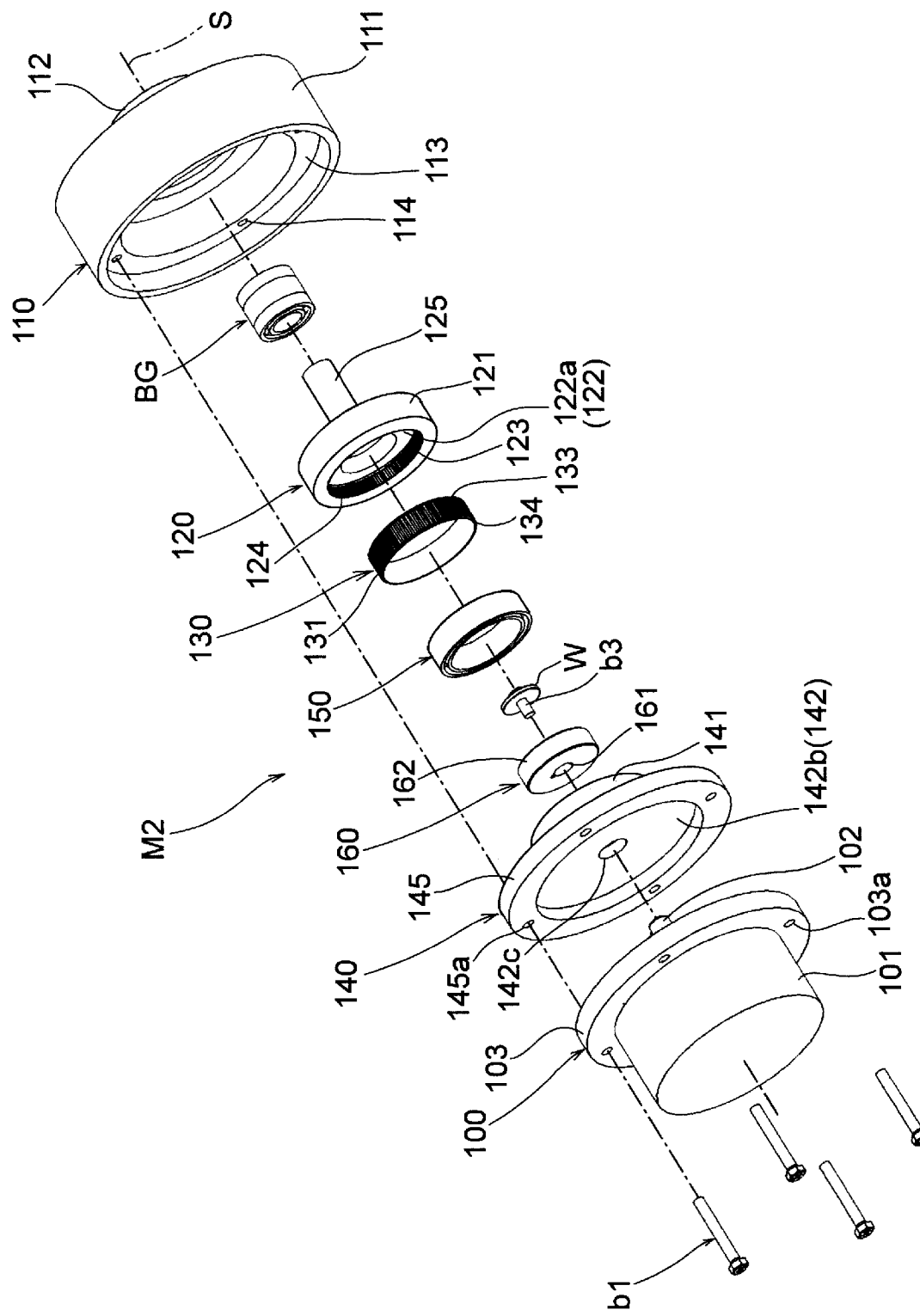
FIG. 13 is an exploded perspective view of the valve timing changing device shown in FIG. 11 as viewed obliquely from the front.

As shown in FIG. 13 and FIG. 15, the first internal gear 120 is formed in a bottomed cylindrical shape integrally having a cylindrical part 121 and a bottom wall part 122 by processing using a metal material, and includes internal teeth 123, a teeth-non-formed part 124, and the output shaft 125 that protrudes in the direction of the axis S from the bottom wall part 122.

The cylindrical part 121 defines an outer peripheral surface centered on the axis S and having an outer diameter dimension to be arranged not in contact with the inside of the housing 110. The bottom wall part 122 is formed as a multi-stepped flat surface perpendicular to the axis S, and defines an inner wall surface 122a with which the end part 132a of the external gear 130 can come into contact, and an outer wall surface 122b from which the output shaft 125 protrudes. The internal teeth 123 form a tooth row having a tooth number Z11 formed by arranging the teeth in an annular shape centered on the axis S on the inner peripheral surface of the cylindrical part 121. Then, the internal teeth 123 mesh with the back side area of substantially half of the external teeth 131 of the external gear 130 in the direction of the axis S. Here, the "back side" is the right side in the direction of the axis S in FIG. 15, that is, the side on which the output shaft 125 is arranged.

Figure 16:
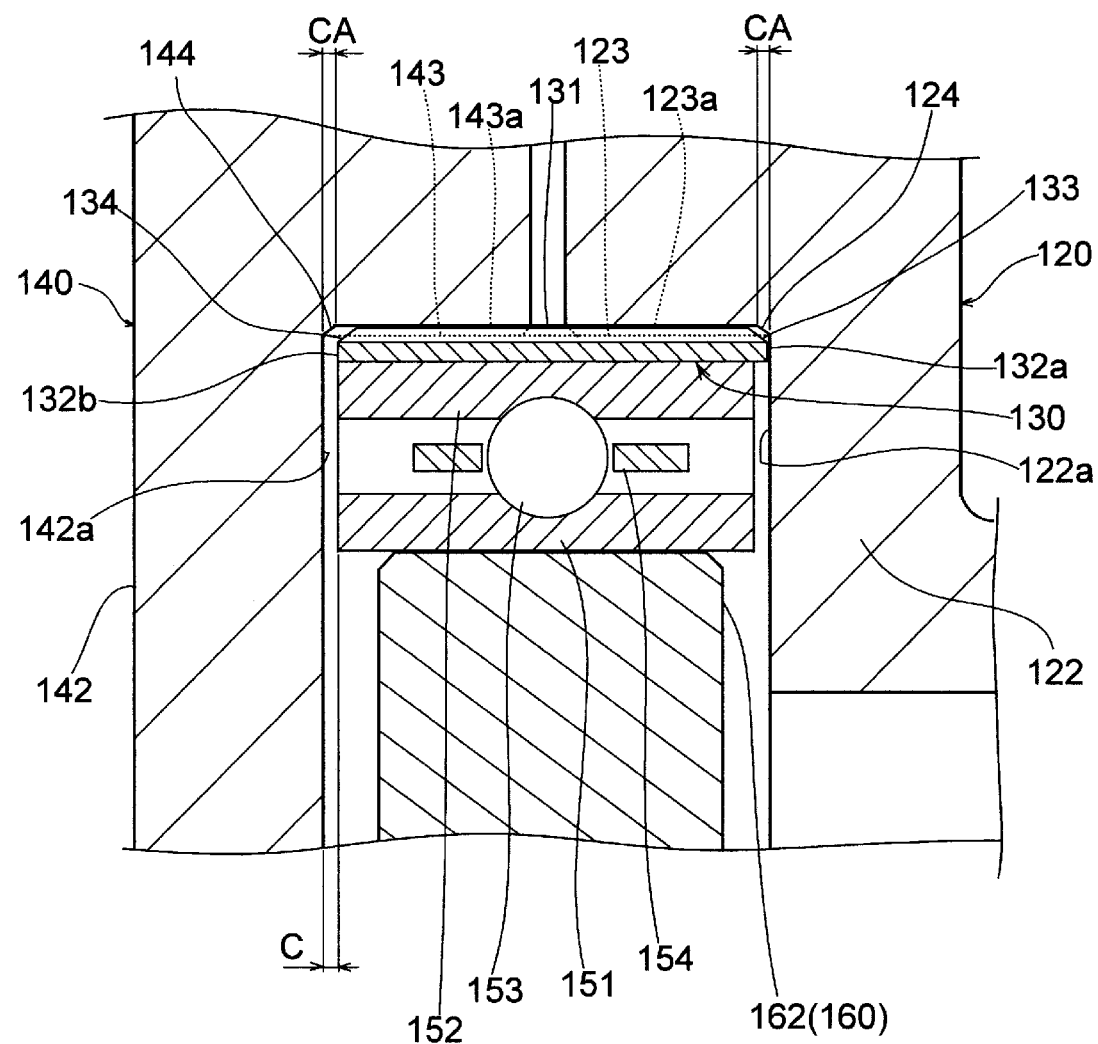
FIG. 16 is a partial cross-sectional view showing the relationship between the external gear, the opposed part of the external gear, the bottomed cylindrical first internal gear, the teeth-non-formed part of the first internal gear, the bottomed cylindrical second internal gear, and the teeth-non-formed part of the second internal gear included in the strain wave gear unit of the invention in the gear transmission device shown in FIG. 11.

As shown in FIG. 13 and FIG. 16, the teeth-non-formed part 124 is an area where the internal teeth 123 are not formed or an area including an incomplete tooth form that does not form a complete tooth form in the corner area CA where the bottom wall part 122 is integrally continuous with the cylindrical part 121, and is an annular convex part that protrudes farther inward than a tooth bottom 123a of the internal teeth 123 and has an inclined cross section with an inner diameter decreasing toward the bottom wall part 122. The teeth-non-formed part 24 is a remaining area that cannot be cut by a cutting blade when the internal teeth 123 are formed by cutting processing. The output shaft 125 is formed in a columnar shape, and is rotatably supported around the axis S by the support part 112 via the bearing BG.

Figure 14:
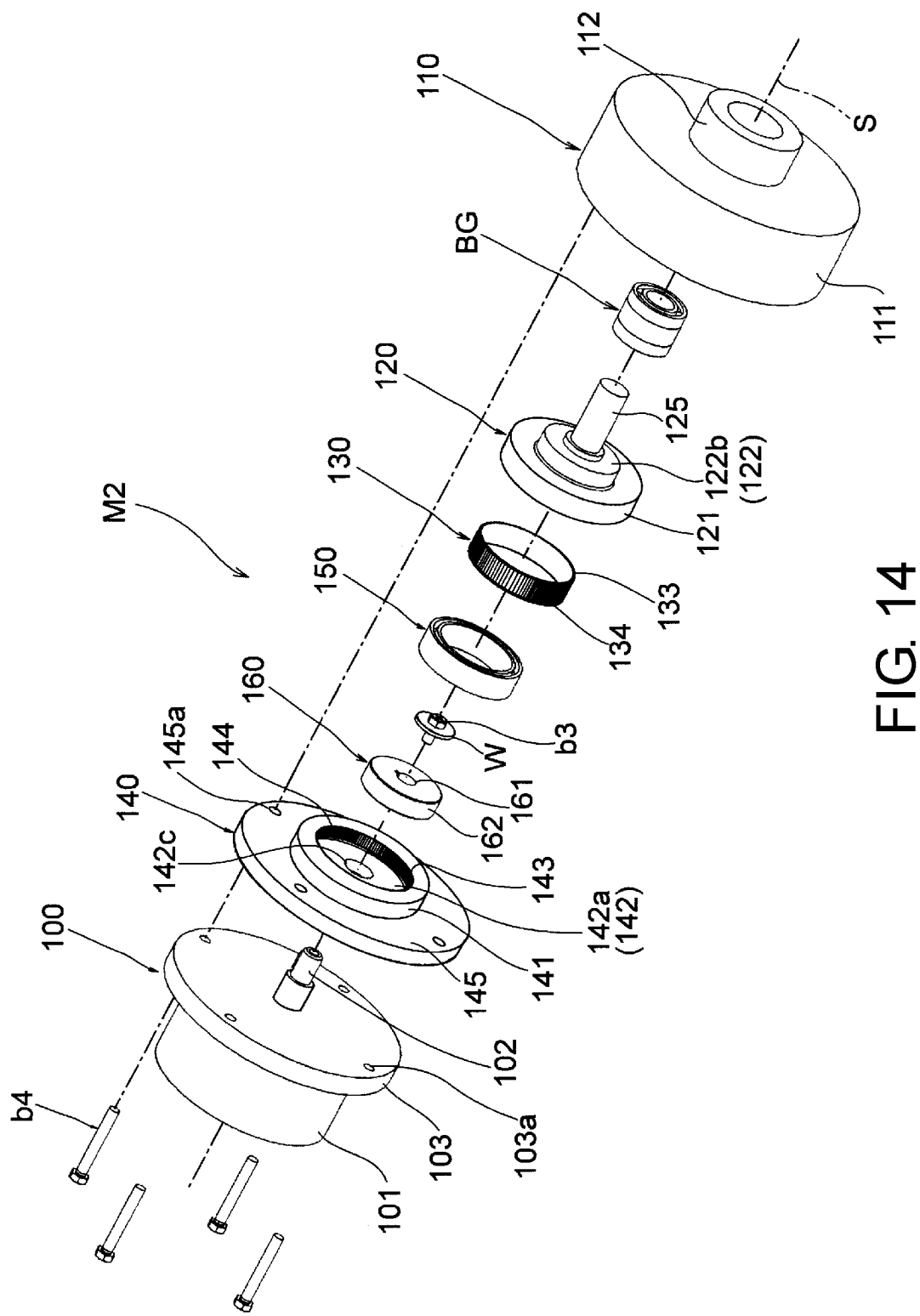
FIG. 14 is an exploded perspective view of the valve timing changing device shown in FIG. 11 as viewed obliquely from the rear.

As shown in FIG. 13, FIG. 14, and FIG. 16, the external gear 130 is formed in a thin cylindrical shape that is elastically deformable using a metal material, and includes the external teeth 131 on the outer peripheral surface, the end parts 132a and 132b that define the width dimension in the direction of the axis S, and the opposed parts 133 and 134 in the outer peripheral areas on both sides in the width direction.

The external teeth 131 form a tooth row having a tooth number Z12 different from the tooth number Z11 of the first internal teeth 120, formed by arranging the teeth in an annular shape centered on the axis S on the outer peripheral surface of the external gear 130. Then, the back side area of substantially half of the external teeth 131 in the direction of the axis S meshes with the internal teeth 123 of the first internal gear 120, and the front side area of substantially half of the external teeth 131 in the direction of the axis S meshes with the internal teeth 143 of the second internal gear 140. Here, the "front side" is the left side in the direction of the axis S in FIG. 15, that is, the side on which the electric motor 100 is arranged. The "back side" is the right side in the direction of the axis S in FIG. 15. The end part 132a has an annular flat surface perpendicular to the axis S, and is opposed to the inner wall surface 122a of the bottom wall part 122 of the first internal gear 120 in the direction of the axis S so as to contact the inner wall surface 122a. The end part 132b has an annular flat surface perpendicular to the axis S, and is opposed to the inner wall surface 142a of the bottom wall part 142 of the second internal gear 140 in the direction of the axis S so as to contact the inner wall surface 142a.

The opposed part 133 is formed by thinning the outer peripheral area of the external gear 130 so as to be opposed to the teeth-non-formed part 124 of the first internal gear 120 with a predetermined gap, that is, have an outer diameter smaller than the inner diameter of the teeth-non-formed part 124, in a state where the end part 132a is in contact with the inner wall surface 122a of the bottom wall part 122 of the first internal gear 120. The opposed part 134 is formed by thinning the outer peripheral area of the external gear 130 so as to be opposed to the teeth-non-formed part 144 of the second internal gear 140 with a predetermined gap, that is, have an outer diameter smaller than the inner diameter of the teeth-non-formed part 144, in a state where the end part 132b is in contact with the inner wall surface 142a of the bottom wall part 142 of the second internal gear 140. Here, when the external gear 130 is formed, by performing staggering processing during trimming processing such as deburring, the opposed part 133 is formed on a conical inclined surface with an outer diameter decreasing toward the end part 132a in the width direction or the opposed part 134 is formed on a conical inclined surface with an outer diameter decreasing toward the end part 132b in the width direction at the same time as the finishing processing.

Then, the external gear 130 is deformed in an oval shape under the cam action of a cam part 162 of the rotation member 160 via the bearing 150, and partially meshes with the first internal gear 120 at two points and partially meshes with the second internal gear 140 at two points.

As shown in FIG. 14 and FIG. 15, the second internal gear 140 is formed in a bottomed cylindrical shape integrally having a cylindrical part 141 and a bottom wall part 142 by processing using a metal material, and includes the internal teeth 143, the teeth-non-formed part 144, and the collar part 145.

The cylindrical part 141 defines an outer peripheral surface centered on the axis S and having an outer diameter dimension to be arranged not in contact with the inside of the housing 110. The bottom wall part 142 is formed as a flat surface perpendicular to the axis S, and defines an inner wall surface 142a with which the end part 132b of the external gear 130 can come into contact, an outer wall surface 142b which is opposed to the main body 101 of the electric motor 100, and a through hole 142c through which the input shaft 102 passes. The internal teeth 143 form a tooth row having a tooth number Z13 formed by arranging the teeth in an annular shape centered on the axis S on the inner peripheral surface of the cylindrical part 141. Then, the internal teeth 143 mesh with the front side area of substantially half of the external teeth 131 of the external gear 130 in the direction of the axis S. Here, the tooth number Z13 of the internal teeth 143 is set to be the same as the tooth number Z12 of the external teeth 131 of the external gear 130. By setting the tooth numbers Z13 and Z12 to be the same (Z13=Z12) in this way, the gear ratio, for example, reduction ratio, can be easily set simply with the tooth number Z11 of the first internal gear 120 and the tooth number Z12 of the external gear 130.

As shown in FIG. 14 and FIG. 16, the teeth-non-formed part 144 is an area where the internal teeth 143 are not formed or an area including an incomplete tooth form that does not form a complete tooth form in the corner area CA where the bottom wall part 142 is integrally continuous with the cylindrical part 141, and is an annular convex part that protrudes farther inward than a tooth bottom 143a of the internal teeth 143 and has an inclined cross section with an inner diameter decreasing toward the bottom wall part 142. The teeth-non-formed part 144 is a remaining area that cannot be cut by a cutting blade when the internal teeth 143 are formed by cutting processing. The collar part 145 is formed to have an outer diameter dimension that is fitted into the fitting concave part 113 of the housing 110, and has a circular hole 145a through which the screw b4 passes.

Then, in a state where the internal teeth 143 mesh with the external teeth 131 of the external gear 130, the collar part 145 of the second internal gear 140 is fitted into the fitting concave part 113 of the housing 110, sandwiched by the flange part 103 of the electric motor 100, and fixed to the housing 110 by screwing the screw b4.

As described above, in a state where the end part 132a of the external gear 130 in contact with the bottom wall part 122 of the first internal gear 120, the opposed part 133 is opposed to the teeth-non-formed part 124 with a gap so interference between the external teeth 131 and the teeth-non-formed part 124 can be prevented. Further, in a state where the end part 132b of the external gear 130 is in contact with the bottom wall part 142 of the second internal gear 140, the opposed part 134 is opposed to the teeth-non-formed part 144 with a gap so interference between the external teeth 131 and the teeth-non-formed part 144 can be prevented. Therefore, as compared with the case where a spacer member or the like is interposed between the end part 132a and the bottom wall part 122 and between the end part 132b and the bottom wall part 142 to prevent interference between the external teeth 131 and the teeth-non-formed parts 124 and 142, the number of parts can be reduced, and the width of the dimensions in the direction of the axis S can be narrowed.

Further, in the above configuration, as shown in FIG. 16, the external gear 130 is arranged with a gap C between the inner wall surface 122a of the bottom wall part 122 of the first internal gear 120 and the inner wall surface 142a of the bottom wall part 142 of the second internal gear 140 in the direction of the axis S. That is, in the direction of the axis S, the width dimension of the external gear 130 is set smaller than the separation dimension between the bottom wall part 122 of the first internal gear 120 and the bottom wall part 142 of the second internal gear 140. As a result, since the external gear 130 can be prevented from contacting both the bottom wall part 122 and the bottom wall part 142 at the same time, the sliding resistance can be reduced.

As shown in FIG. 15 and FIG. 16, the bearing 150 includes an annular inner ring 151, an annular outer ring 152, a plurality of rolling elements 153 rollably arranged between the inner ring 151 and the outer ring 152, and a retainer 154 for holding the plurality of rolling elements 153.

The inner ring 151 is formed in the shape of an endless belt that is elastically deformable using a metal material, and the cam part 162 of the rotation member 160 is fitted thereinto. The outer ring 152 is formed in the shape of an endless belt that is elastically deformable using a metal material, and is fitted inside the external gear 130. The plurality of rolling elements 153 are formed into spheres using a metal material, and are sandwiched between the inner ring 151 and the outer ring 152 and are held at equal intervals around the axis S by the retainer 154. The retainer 154 is formed in the shape of an endless belt that is elastically deformable using a metal material, and holds the plurality of rolling elements 153 rollably at equal intervals.

Then, the inner ring 151 and the outer ring 152 of the bearing 150 are deformed in an oval shape along the cam part 162 of the rotation member 160. Since the bearing 150 is interposed between the cam part 162 of the rotation member 160 and the external gear 130 in a state of being deformed in an oval shape, the external gear 130 can be smoothly deformed in an oval shape as the rotation member 160 rotates.

As shown in FIG. 13 to FIG. 15, the rotation member 160 is formed in a substantially cylindrical shape, and includes a fitting hole 161 and the cam part 162. The fitting hole 161 is formed so that the input shaft 102 of the electric motor 100 is fitted thereinto for the rotation member 160 to rotate integrally with the input shaft 102. The cam part 162 is formed in an oval ring shape whose outer peripheral surface defines an oval shape having a major axis in a linear direction perpendicular to the axis S, and exerts the cam action for generating elliptical deformation on the external gear 130.

Then, the rotation member 160 receives the rotational force of the electric motor so that the cam part 162 exerts the cam action on the external gear 130. As a result, the external gear 130 in the state of meshing with the first internal gear 120 and the second internal gear 140 is deformed in an oval shape and its meshing position continuously changes around the axis S.

The relationship between the first internal gear 120, the external gear 130, and the second internal gear 140 in the above configuration will be described. Since the relationship between the tooth number Z11 of the first internal gear 120 and the tooth number Z12 of the external gear 130 causes relative rotation, it is set that when the number of meshing points of the first internal gear 120 and the external gear 130 is N and a positive integer is n, the relationship of Z12=Z11±n·N is established. In this embodiment, since N=2, for example, Z11=162 and Z12=160 are set. Further, as for the relationship between the tooth number Z13 of the second internal gear 140 and the tooth number Z12 of the external gear 130, the same value is selected so as to rotate them in the same phase without causing relative rotation as described above. In this embodiment, for example, Z13=160 and Z12=160 are set.

In the gear transmission device M2 having the above configuration, when the input shaft 102 is rotated by the driving force of the electric motor 100, the speed is reduced by the strain wave gear unit and the output shaft 125 is rotated. In this shifting operation, the external gear 130 moves in the direction of the axis S due to the thrust force generated by the difference in the meshing state between the internal teeth 123 and the internal teeth 143 with respect to the external teeth 131 of the external gear 130.

When the external gear 130 moves toward the back side in the direction of the axis S and the end part 132a comes into contact with the bottom wall part 122 of the first internal gear 120, since the opposed part 133 is opposed to the teeth-non-formed part 124 with a gap, interference between the external teeth 131 and the teeth-non-formed part 124 can be prevented. As a result, the external teeth 131 of the external gear 130 can normally mesh with the internal teeth 123 of the first internal gear 120 and rotate smoothly. On the other hand, when the external gear 130 moves toward the front side in the direction of the axis S and the end part 132b comes into contact with the bottom wall part 142 of the second internal gear 140, since the opposed part 134 is opposed to the teeth-non-formed part 144 with a gap, interference between the external teeth 131 and the teeth-non-formed part 144 can be prevented. As a result, the external teeth 131 of the external gear 130 can normally mesh with the internal teeth 143 of the second internal gear 140 and rotate smoothly.

Further, as shown in FIG. 16, since the external gear 130 is arranged with the gap C between the bottom wall part 122 (inner wall surface 122a) of the first internal gear 120 and the bottom wall part 142 (inner wall surface 142a) of the second internal gear 140, the external gear 130 does not contact both the bottom wall part 122 and the bottom wall part 142 at the same time, and the sliding resistance can be reduced correspondingly. The gear transmission device M2 having the above configuration can simplify the structure, reduce the size, reduce the number of parts, and lower the cost.

The above embodiment shows the second internal gear 140 in which the cylindrical part 141 and the bottom wall part 142 are integrally formed as the second internal gear, but the invention is not limited thereto. A configuration, in which the second internal gear is formed in a cylindrical shape and the cover member is arranged adjacent to the second internal gear and fixed to the second internal gear, may be used.

The embodiment according to the above valve timing changing device M shows a configuration in which the bearing 70 is interposed between the external gear 40 and the rotation member 70, but the invention is not limited thereto. A configuration, in which the external gear 40 is directly fitted into the cam part 73, may be used. Further, the bearing 60 including the inner ring 61, the rolling elements 63, and the outer ring 62 is shown as the bearing, but the invention is not limited thereto. A configuration, in which the bearing is composed of the inner ring and the rolling elements, and the external gear 40 is applied instead of the outer ring, may be used.

The embodiment according to the above gear transmission device M2 shows a configuration in which the bearing 150 is interposed between the external gear 130 and the rotation member 160, but the invention is not limited thereto. A configuration, in which the external gear 130 is directly fitted into the cam part 162, may be used. Further, the bearing 150 including the inner ring 151, the rolling elements 153, and the outer ring 152 is shown as the bearing, but the invention is not limited thereto. A configuration, in which the bearing is composed of the inner ring and the rolling elements, and the external gear 130 is applied instead of the outer ring, may be used.

As described above, since the strain wave gear unit of the invention can simplify the structure, reduce the size, reduce the number of parts, and lower the cost, it can of course be applied as a phase changing unit of a valve timing changing device and as a transmission unit of a gear transmission device, and it can also be applied as a speed reducer, a speed increaser, a transmission or the like in other rotation transfer devices.

What is claimed is:
1. A strain wave gear unit, comprising:
a first internal gear having a bottomed cylindrical shape and comprising a first plurality of internal teeth that are formed on a cylindrical part, and a teeth-non-formed part that protrudes farther inward than a tooth bottom of the internal teeth in a corner area where a bottom wall part is integrally continuous with the cylindrical part;

an external gear being flexible, having a cylindrical shape, and comprising a plurality of external teeth that mesh with the internal teeth of the first internal gear, an opposed part that is opposed to the teeth-non-formed part with a gap, and an end part that is opposed to the bottom wall part so as to contact the bottom wall part;

a second internal gear arranged adjacent to the first internal gear and comprising a second plurality of internal teeth that mesh with the external teeth; and a rotation member causing the external gear to deform in an oval shape and causing a meshing position to move while partially meshing with the first internal gear and the second internal gear.

2. The strain wave gear unit according to claim 1, wherein the external gear comprises the opposed part on each of both sides in a width direction.

3. The strain wave gear unit according to claim 2, wherein the second internal gear is formed in a second bottomed cylindrical shape and comprises the second plurality of internal teeth formed on a second cylindrical part, and a second teeth-non-formed part that protrudes farther inward than a second tooth bottom of the second plurality of internal teeth in a second corner area where a second bottom wall part is integrally continuous with the second cylindrical part.

4. The strain wave gear unit according to claim 3, wherein a width dimension of the external gear is set to be smaller than a separation dimension between the bottom wall part of the first internal gear and the second bottom wall part of the second internal gear.

5. The strain wave gear unit according to claim 1, wherein the second internal gear has a cylindrical shape, the second internal gear is provided with a cover member that is adjacent to a side opposite to the first internal gear and covers the external gear, and a width dimension of the external gear is set to be smaller than a separation dimension between the bottom wall part of the first internal gear and the cover member.

6. The strain wave gear unit according to claim 1, wherein the first internal gear comprises an oil passage that has a groove shape and extends in a radial direction on the bottom wall part to which the end part is opposed.

7. The strain wave gear unit according to claim 1, wherein the opposed part is formed by thinning an outer peripheral area of the external gear.

8. The strain wave gear unit according to claim 7, wherein the opposed part is a conical inclined surface.

9. The strain wave gear unit according to claim 7, wherein the opposed part is a cylindrical surface having a smaller outer diameter than a diameter of the external teeth.

10. The strain wave gear unit according to claim 7, wherein the opposed part is formed of a conical inclined surface and a cylindrical surface that is continuous with the inclined surface and has a smaller outer diameter than a diameter of the external teeth.

11. A gear transmission device, comprising an input shaft, an output shaft, a housing rotatably supporting the output shaft, and a transmission unit interposed between the input shaft and the output shaft, wherein the transmission unit comprises the strain wave gear unit according to claim 1.

12. The gear transmission device according to claim 11, wherein the rotation member of the strain wave gear unit rotates integrally with the input shaft, the first internal gear of the strain wave gear unit rotates integrally with the output shaft, and the second internal gear of the strain wave gear unit is fixed to the housing.

13. A valve timing changing device for an engine, comprising a phase changing unit that changes a relative rotation phase of a camshaft and a housing rotor interlocked with a crankshaft, and changing an opening/closing timing of an intake or exhaust valve driven by the camshaft to an advance angle side or a retard angle side, wherein the phase changing unit comprises the strain wave gear unit according to claim 1, the first internal gear of the strain wave gear unit is connected so as to rotate integrally with the camshaft, and the second internal gear of the strain wave gear unit is connected so as to rotate integrally with the housing rotor.

14. The valve timing changing device according to claim 13, wherein the rotation member of the strain wave gear unit is formed so as to transmit a rotational force of an electric motor.

* * * * *